US010681416B2

(12) United States Patent
Yamamoto et al.

(10) Patent No.: US 10,681,416 B2
(45) Date of Patent: Jun. 9, 2020

(54) QUALITY-OF-EXPERIENCE OPTIMIZATION SYSTEM, QUALITY-OF-EXPERIENCE OPTIMIZATION APPARATUS, RECOMMEND REQUEST APPARATUS, QUALITY-OF-EXPERIENCE OPTIMIZATION METHOD, RECOMMEND REQUEST METHOD, AND PROGRAM

(71) Applicant: NIPPON TELEGRAPH AND TELEPHONE CORPORATION, Chiyoda-ku (JP)

(72) Inventors: Hiroshi Yamamoto, Musashino (JP); Kazumichi Sato, Musashino (JP); Taichi Kawano, Musashino (JP); Kei Takeshita, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 15/548,108

(22) PCT Filed: Dec. 24, 2015

(86) PCT No.: PCT/JP2015/086087
§ 371 (c)(1),
(2) Date: Aug. 2, 2017

(87) PCT Pub. No.: WO2016/125415
PCT Pub. Date: Aug. 11, 2016

(65) Prior Publication Data
US 2018/0027293 A1   Jan. 25, 2018

(30) Foreign Application Priority Data
Feb. 4, 2015   (JP) ................. 2015-020500

(51) Int. Cl.
*H04N 21/462* (2011.01)
*H04L 29/06* (2006.01)
(Continued)

(52) U.S. Cl.
CPC ......... *H04N 21/4621* (2013.01); *G06F 13/00* (2013.01); *H04L 65/4084* (2013.01);
(Continued)

(58) Field of Classification Search
None
See application file for complete search history.

(56) References Cited

U.S. PATENT DOCUMENTS 5,742,892 A * 4/1998 Chaddha .................. G06T 9/008
375/240.11
7,447,287 B1 * 11/2008 Parantainen .......... H04L 1/0009
375/354
(Continued)

FOREIGN PATENT DOCUMENTS

CN   102404565 A   4/2012
JP   2012-070373 A   4/2012
(Continued)

OTHER PUBLICATIONS

International Search Report dated Mar. 29, 2016 in PCT/JP2015/086087, filed Dec. 24, 2015.
(Continued)

*Primary Examiner* — Ricky Chin
(74) *Attorney, Agent, or Firm* — Oblon, McClelland, Maier & Neustadt, L.L.P.

(57) ABSTRACT

A quality-of-experience optimization system configured to optimize quality (QoE: Quality of Experience) that a user experiences in a content distribution service, including: a recommend request apparatus configured to output a distribution parameter candidate of content distribution for opti-
(Continued)

mizing QoE of content distribution, and to receive a distribution parameter for optimizing the QoE as a recommend value; and a quality-of-experience optimization apparatus configured to estimate QoE from the distribution parameter candidate received from the recommend request apparatus, and to calculate a distribution parameter for optimizing the QoE as a recommend value to output the recommend value.

9 Claims, 40 Drawing Sheets

(51) Int. Cl.
G06F 13/00 (2006.01)
H04N 21/2662 (2011.01)
H04N 21/6379 (2011.01)
H04N 21/442 (2011.01)
H04N 21/472 (2011.01)

(52) U.S. Cl.
CPC ......... *H04L 65/80* (2013.01); *H04N 21/2662* (2013.01); *H04N 21/44209* (2013.01); *H04N 21/472* (2013.01); *H04N 21/6379* (2013.01)

(56) References Cited

U.S. PATENT DOCUMENTS

| | | | |
|---|---|---|---|
| 8,819,106 B1* | 8/2014 | Sirota | G06F 9/485 709/201 |
| 9,955,195 B2* | 4/2018 | Soroushian | H04N 21/234372 |
| 2004/0028003 A1* | 2/2004 | Diener | H04L 1/0001 370/319 |
| 2005/0163059 A1* | 7/2005 | Dacosta | H04L 41/0896 370/252 |
| 2005/0271002 A1* | 12/2005 | Abe | H04W 28/20 370/328 |
| 2007/0280349 A1* | 12/2007 | Prieto | H04N 19/124 375/240.03 |
| 2008/0016185 A1* | 1/2008 | Herberger | G06F 17/30056 709/219 |
| 2008/0068995 A1* | 3/2008 | Skog | H04L 29/06 370/230.1 |
| 2008/0084896 A1* | 4/2008 | Fleury | H04L 29/06027 370/468 |
| 2008/0278582 A1* | 11/2008 | Chung | H04N 7/18 348/159 |
| 2008/0320526 A1* | 12/2008 | Franceschini | H04W 76/15 725/62 |
| 2012/0062791 A1* | 3/2012 | Thakolsri | H04L 65/00 348/441 |
| 2012/0263051 A1* | 10/2012 | Willars | H04W 76/04 370/252 |
| 2013/0044592 A1* | 2/2013 | Kim | H04W 72/1236 370/229 |
| 2013/0044807 A1* | 2/2013 | Lamy-Bergot | H04N 21/234327 375/240.03 |
| 2013/0058393 A1* | 3/2013 | Soroushian | H04N 21/234372 375/240.01 |
| 2013/0091248 A1 | 4/2013 | Viswanathan et al. | |
| 2013/0275557 A1 | 10/2013 | Myers et al. | |
| 2013/0275610 A1* | 10/2013 | Mahajan | H04N 21/23106 709/231 |
| 2013/0322242 A1* | 12/2013 | Swenson | H04L 47/11 370/232 |
| 2013/0329781 A1* | 12/2013 | Su | H04N 21/23424 375/240.02 |
| 2014/0040959 A1 | 2/2014 | Oyman | |
| 2014/0258552 A1* | 9/2014 | Oyman | H04N 19/146 709/231 |
| 2014/0280801 A1* | 9/2014 | Cardona | H04L 47/127 709/221 |
| 2014/0351385 A1* | 11/2014 | Li | H04L 65/601 709/219 |
| 2015/0009826 A1* | 1/2015 | Ma | H04W 28/0268 370/235 |
| 2016/0105821 A1* | 4/2016 | Senarath | H04W 4/00 370/329 |
| 2016/0212758 A1* | 7/2016 | Leung | G06Q 10/00 |
| 2016/0219342 A1* | 7/2016 | Follesa | H04N 21/21805 |
| 2016/0315956 A1* | 10/2016 | Giladi | H04L 63/1416 |
| 2017/0085872 A1* | 3/2017 | Perron | H04N 19/117 |
| 2017/0237784 A1* | 8/2017 | Maistri | H04L 65/1083 348/14.02 |
| 2017/0374167 A1* | 12/2017 | Takeshita | H04L 67/22 |
| 2018/0152715 A1* | 5/2018 | Sevin | H04N 19/103 |

FOREIGN PATENT DOCUMENTS

| | | |
|---|---|---|
| WO | 2013/123467 A1 | 8/2013 |
| WO | 2014/022017 A1 | 2/2014 |

OTHER PUBLICATIONS http://faq.nicovideo.jp/EokpControl?&tid=11483&event-=FE0006, "niconico>help>what is economy mode", niconico video, Dec. 2, 2014 internet search, 2pages (with partial English translation).
Rich Wolski, et al., "The Network Weather Service: A Distributed Resource Performance Forecasting Service for Metacomputing", Future Genera. Comput. Syst. 15, 5-6, Oct. 1999 (19 pages).
Takashi Oshiba, et al. "Quick End-to-end Available Bandwidth Estimation for Real-time Communication". IPSJ Journal, 53 (2), vol. 53, No. 2, Feb. 2012 pp. 698-711 (with English abstract).
Masayuki Hiromoto, et al. "Media Streaming System with Dynamic Rate Control for High Speed Mobile Networks", IPSJ Journal, 50, No. 10, Oct. 1, 2009, pp. 2532-2542 (with English abstract).
Shigeyuki Sakazawa, et al., "A Study on Dynamic Control of Coding Rate for TCP Video Streaming", The Institute of Image Information and Television Engineers, (IEICE Technical Report, IE, image engineering, 102(469), Nov. 15, 2002, pp. 19-24 (with English abstract).
https://support.google.com/youtube/answer/91449?hl=ja, "YouTube >help>image quality", Dec. 2, 2014 , 3 pages, (with partial English translation).
Office Action dated Sep. 26, 2019 in Chinese Application No. 201580075264.6.

\* cited by examiner

FIG.3

| No. | FUNCTION NAME | FUNCTION SUMMARY |
|---|---|---|
| 11 | THROUGHPUT ESTIMATION FUNCTION | FUNCTION FOR CALCULATING INFORMATION ON THROUGHPUT FROM INPUT INFORMATION OF OTT |
| 12 | PLAYBACK STOP STATE ESTIMATION FUNCTION | FUNCTION FOR CALCULATING INFORMATION ON PLAYBACK STOP FROM INFORMATION ON INPUT INFORMATION OF OTT AND THROUGHPUT |
| 13 | QoE ESTIMATION FUNCTION | FUNCTION FOR CALCULATING QoE FROM INFORMATION ON CODING |
| 14 | RESOLUTION · FRAME RATE RECOMMEND FUNCTION | FUNCTION FOR CALCULATING RESOLUTION AND FRAME RATE BY WHICH QoE BECOMES MAXIMUM FROM CODING BIT RATE |
| 15 | INITIAL CODING PARAMETER RECOMMEND FUNCTION | FUNCTION FOR CALCULATING CODING PARAMETER BY WHICH AVERAGE QoE OF WHOLE USERS BECOMES MAXIMUM |
| 16 | REAL-TIME CODING PARAMETER RECOMMEND FUNCTION | FUNCTION FOR CALCULATING INFORMATION ON CODING PARAMETER FROM INPUT INFORMATION OF OTT |
| 21 | THROUGHPUT TABLE INFORMATION UPDATE FUNCTION | FUNCTION FOR UPDATING THROUGHPUT TABLE |
| 22 | VIEWING LOG UPDATE FUNCTION | FUNCTION FOR NEWLY GENERATING AND UPDATING VIEWING LOG |
| 23 | SETTING VALUE REFERENCE FUNCTION | FUNCTION FOR REFERRING AND UPDATING SETTING VALUE |

FIG. 5A

| DATA NAME | DATA FORMAT | SAMPLE VALUE | LOWER LIMIT VALUE | UPPER LIMIT VALUE | DATA SUMMARY | RELATED FUNCTION |
|---|---|---|---|---|---|---|
| SERVICE ID | SI32 | 1 | - | - | ID ASSIGNED FOR EACH SERVICE (1: ICOICO VIDEO) | I11, I12, I13, I14, I15, I16, I22 |
| DESIGN ID | SI32 | 1 | - | - | ID INDICATING DESIGN UNIT (MOBILE or PC ETC.) | I11, I12, I13, I14, I15, I16, I22 |
| DATE AND TIME | YYYYMMDDHHmmssZ | 20131130060213+09:00 | - | - | YEAR MONTH DATE TIME MINUTE SECOND OF START OF VIEWING (INCLUDING TIME ZONE) | I11, I16, I22 |
| IP ADDRESS | STRING | 129.60.58.1 | - | - | IPv4, IPv6 | I11, I16, I22 |
| USING SERVER | STRING(32Byte) | fa12737faa0c533fc3bea 251d326361165ad54e | - | - | IDENTIFIER FOR UNIQUELY IDENTIFYING USING SERVER UNDER SAME SERVICE ID AND DESIGN ID. SET BY HASHING | I11, I16, I22 |
| FIXED/ MOBILE IDENTIFIER | BOOL | 0 | 0 | 1 | 0: FIXED, 1: MOBILE | I11, I16, I22 |
| USER ID | STRING(32Byte) | cfcd208495d565ef66e7dff 9f98764da | - | - | ID ASSIGNED FOR EACH USER | I11, I16, I22 |
| CARRIER NAME | STRING(20Byte) | 44010 | - | - | USING CARRIER NAME (INFORMATION THAT CAN SPECIFY CARRIER, SUCH AS APN, PLMN) | I11, I16, I22 |
| COORDI- NATE | FLOAT FLOAT | 35.681382, 139.766084 | - | - | COORDINATE OF GPS (lat,long) | I11, I16, I22 |
| CELL ID INFORMA- TION | UI32[4] or UI32[3] | [0, 24324, 1902, 12348] [0, 2341, 74662167] | - | - | IDENTIFIER OF MOBILE NW SUCH AS 3G, LTE (0:3G(UMTS), 1:3G(CDMA), 2:LTE) AND BASE STATION ID. BASE STATION ID IS DEFINED BY SET OF (LAC, Cell ID) (UMTS/LTE), OR BY SET OF (Sid, Nid, Bid) (CDMA) | I11, I16, I22 |

FIG.5B

| DATA NAME | DATA FORMAT | SAMPLE VALUE | LOWER LIMIT VALUE | UPPER LIMIT VALUE | DATA SUMMARY | RELATED FUNCTION |
|---|---|---|---|---|---|---|
| SERVER SPEED CONTROL | SI32 | 500 | 0 | CONF | SPEED WHEN SPEED CONTROL IS APPLIED IN SERVER SIDE [Kbps] | I11, I16, I22 |
| THROUGHPUT AVERAGE AVERAGE | SI32 | 1200 | 0 | CONF | AVERAGE OF MEASURED THROUGHPUT AVERAGE [Kbps] | O11 |
| THROUGHPUT AVERAGE DEVIATION | SI32 | 800 | 0 | CONF | STANDARD DEVIATION OF MEASURED THROUGHPUT AVERAGE [Kbps] | O11 |
| THROUGHPUT DEVIATION AVERAGE | SI32 | 500 | 0 | CONF | AVERAGE OF MEASURED THROUGHPUT STANDARD DEVIATION [Kbps] | O11, I12 |
| USER ACTUAL RESULT AVERAGE AVERAGE | SI32 | 1200 | 0 | CONF | AVERAGE OF MEASURED THROUGHPUT AVERAGE OF SPECIFIC USER [Kbps] | O11, I12 |
| USER ACTUAL RESULT AVERAGE DEVIATION | SI32 | 800 | 0 | CONF | STANDARD DEVIATION OF MEASURED THROUGHPUT AVERAGE OF SPECIFIC USER [Kbps] | O11, I12 |
| USER ACTUAL RESULT DEVIATION AVERAGE | SI32 | 500 | 0 | CONF | AVERAGE OF MEASURED THROUGHPUT STANDARD DEVIATION OF SPECIFIC USER [Kbps] | O11, I12 |
| CODING BIT RATE | SI32 | 300 | 0 | CONF | CODING BIT RATE OF DISTRIBUTED VIDEO [Kbps] | I12, I13, I14, O16 |

FIG.5C

| DATA NAME | DATA FORMAT | SAMPLE VALUE | LOWER LIMIT VALUE | UPPER LIMIT VALUE | DATA SUMMARY | RELATED FUNCTION |
|---|---|---|---|---|---|---|
| AVERAGE THROUGHPUT | SI32 | 600 | 0 | CONF | AVERAGE COMMUNICATION SPEED PER UNIT TIME [Kbps] | I12 |
| THROUGHPUT DEVIATION | SI32 | 300 | 0 | CONF | STANDARD DEVIATION OF COMMUNICATION SPEED [Kbps] | I12 |
| VIDEO DURATION | SI32 | 500 | 0 | CONF | VIDEO DURATION (LENGTH OF TIME) [s] | I12, I16 |
| PLAYBACK START THRESHOLD | SI32 | 50000 | *3 | CONF | THRESHOLD OF DATA AMOUNT STORED IN BUFFER FOR START OF PLAYBACK [Byte] | (I12), (I16) |
| PLAYBACK RESTART THRESHOLD | SI32 | 20000 | *3 | CONF | THRESHOLD OF DATA AMOUNT STORED IN BUFFER FOR RESTART OF PLAYBACK [Byte] | (I12), (I16) |
| PLAYBACK STOP THRESHOLD | SI32 | 10000 | 0 | *3 | THRESHOLD OF DATA AMOUNT STORED IN BUFFER FOR STOP OF PLAYBACK [Byte] | (I12), (I16) |
| AVERAGE NUMBER OF TIMES OF PLAYBACK STOP | FLOAT | 10.6 | 0 | CONF | AVERAGE NUMBER OF TIMES OF PLAYBACK STOP | O12 |
| AVERAGE PLAYBACK STOP TIME | FLOAT | 123.5 | 0 | CONF | AVERAGE OF PLAYBACK STOP TIME [s] | O12 |

FIG.5D

| DATA NAME | DATA FORMAT | SAMPLE VALUE | LOWER LIMIT VALUE | UPPER LIMIT VALUE | DATA SUMMARY | RELATED FUNCTION |
|---|---|---|---|---|---|---|
| NUMBER OF TIMES OF PLAYBACK STOP | SI32 | 4 | 0 | CONF | NUMBER OF TIMES OF PLAYBACK STOP PER 15 SECONDS | O12, (I13), (I14) |
| PLAYBACK STOP TIME LENGTH | FLOAT | 2 | 0 | CONF | NUMBER OF SECONDS OF ONE TIME PLAYBACK STOP | — |
| ARRAY OF PLAYBACK STOP TIME LENGTH | FLOAT [NUMBER OF TIMES OF PLAYBACK STOP] | | — | — | ARRAY OF PLAYBACK STOP TIME LENGTH FOR 10 SECONDS. ARRAY SIZE IS THE SAME AS THE NUMBER OF TIMES OF PLAYBACK STOP | O12, (I13), (I14) |
| RESOLUTION | SI32 | 2073600 | CONF | CONF | NUMBER OF PIXELS PER 1 FRAME OF VIDEO | I13, O14, O16 |
| FRAME RATE | FLOAT | 30 | CONF | CONF | NUMBER OF FRAMES PER ONE SECOND [fps] | I13, O14, O16 |
| QoE | FLOAT | 3.5 | 1 | 5 | ESTIMATED VALUE OF SUBJECTIVE QUALITY (1-5) | O13, O14, O16 |
| RESOLUTION ARRAY | SI32[N] | | — | — | ONE DIMENSIONAL ARRAY OF RESOLUTION OF SIZE N | (I14) |
| FRAME RATE ARRAY | FLOAT[N] | | — | — | ONE DIMENSIONAL ARRAY OF FRAME RATE OF SIZE N | (I14) |
| NUMBER OF ENCODINGS | SI32 | 3 | 1 | CONF | NUMBER OF VIDEO FILES ENCODED BY CHANGING CODING BIT RATE FOR ONE CONTENT | I15 |
| CODING BIT RATE ARRAY | SI32[N] | | — | — | ONE DIMENSIONAL ARRAY OF CODING BIT RATE | (I15) |
| WHOLE AVERAGE QoE | FLOAT | 3.5 | 1 | 5 | AVERAGE VALUE OF QoE OF ALL TARGET USERS | O15 |

FIG.5E

| DATA NAME | DATA FORMAT | SAMPLE VALUE | LOWER LIMIT VALUE | UPPER LIMIT VALUE | DATA SUMMARY | RELATED FUNCTION |
|---|---|---|---|---|---|---|
| CODING PARAMETER TABLE | - | - | - | - | TABLE HAVING COLUMNS OF CODING BIT RATE, RESOLUTION, FRAME RATE, QoE | O15 |
| OTT CODING PARAMETER TABLE | - | - | - | - | TABLE HAVING COLUMNS OF CODING BIT RATE, RESOLUTION, FRAME RATE | I16 |
| NUMBER OF TIMES OF VIDEO STOP | SI32 | 2 | 0 | CONF | NUMBER OF TIMES OF STOP OF VIEWING VIDEO | I22 |
| MEASURED THROUGHPUT AVERAGE | SI32 | 1000 | 0 | CONF | MEASURED VALUE OF AVERAGE OF THROUGHPUTS FOR EACH VIEW [kbps] | I22 |
| MEASURED THROUGHPUT DEVIATION | SI32 | 300 | 0 | CONF | MEASURED VALUE OF STANDARD DEVIATION OF THROUGHPUTS FOR EACH VIEW [kbps] | I22 |
| VIDEO FILE ID | STRING(32) | sm19283759 | - | - | ID OF VIEWED VIDEO | I22 |
| USE BROWSER | STRING(250) | Mozilla/5.0 | - | - | IDENTIFIER OF BROWSER USED FOR VIEWING (ASSUMING User Agent) | I22 |
| USE OS | STRING(20) | iOS7.0 | - | - | IDENTIFIER OF OS OF TERMINAL USED FOR VIEWING | I22 |
| wi-fi USE DETERMINATION | BOOL | 0 | 0 | 1 | WHETHER Wifi IS USED (0: NOT USE, 1: USE) | I22 |
| FILE SIZE | SI32 | 23 | 0 | - | FILE SIZE OF VIEWED VIDEO [MB] | I22 |
| VIDEO BIT RATE | SI32 | 434 | 0 | - | BIT RATE OF VIEWED VIDEO [kbps] | I22 |
| OPTION TAG 1-10 | ALL STRING(32) | UNDETERMINED | - | - | AREA FOR EXPANSION IN THE FUTURE | I22 |
| DISTRIBUTION SERVER GROUP | SI32 | 1 | 0 | 1 | FOR DEFINING DISTRIBUTION CONDITION, DEFAULT 0 | I11, I16, I22 |

FIG.6A

| DATA NAME | DATA FORMAT | DATA SUMMARY |
|---|---|---|
| CALENDAR INFORMATION | SI32 | CALENDAR ID (IT MAY BE SI16 SINCE UPPER LIMIT OF THE NUMBER IS ABOUT 10000) |
| NW NAME | SI32 | NETWORK ID (ASSIGNED FOR EACH "ISP × PREFECTURE") |
| CARRIER IDENTIFIER | SI32 | ID THAT UNIQUELY DEFINES CARRIER (ASSIGNED FOR EACH "CARRIER") |
| NW SPEED | SI32[3] | COMBINATION OF THROUGHPUT AVERAGE AVERAGE, THROUGHPUT AVERAGE DEVIATION, THROUGHPUT DEVIATION AVERAGE (DETERMINED BY GIVEN CALENDAR INFORMATION/NW NAME, OR, PRESENCE OR ABSENCE OF INDIVIDUAL LOG) |
| SERVER SPEED | SI32[3] | COMBINATION OF THROUGHPUT AVERAGE AVERAGE, THROUGHPUT AVERAGE DEVIATION, THROUGHPUT DEVIATION AVERAGE (DETERMINED BY GIVEN CALENDAR INFORMATION/USE SERVER, OR INPUT FROM SERVER) |
| QoE_C | FLOAT | INTERMEDIATE PARAMETER FOR CALCULATING QoE (1-5) |
| QoE_C2 | FLOAT | INTERMEDIATE PARAMETER FOR CALCULATING QoE (1-5) |
| QoE_CR | FLOAT | INTERMEDIATE PARAMETER FOR CALCULATING QoE (1-5) |

FIG.6B

| DATA NAME | DATA FORMAT | DATA SUMMARY |
|---|---|---|
| COEFFICIENT ARRAY 1 | FLOAT[N] | ARRAY OF VALUE OF COEFFICIENT OF EQUATION 1 |
| COEFFICIENT ARRAY 2 | FLOAT[N] | ARRAY OF VALUE OF COEFFICIENT OF EQUATION 2 |
| COEFFICIENT ARRAY 3 | FLOAT[N] | ARRAY OF VALUE OF COEFFICIENT OF EQUATION 3 |
| COEFFICIENT ARRAY 4 | FLOAT[N] | ARRAY OF VALUE OF COEFFICIENT OF EQUATION 4 |
| COEFFICIENT ARRAY 5 | FLOAT[N] | ARRAY OF VALUE OF COEFFICIENT OF EQUATION 5 |
| COEFFICIENT ARRAY 6 | FLOAT[N] | ARRAY OF VALUE OF COEFFICIENT OF EQUATION 6 |
| COEFFICIENT ARRAY 7 | FLOAT[N] | ARRAY OF VALUE OF COEFFICIENT OF EQUATION 7 |
| COEFFICIENT ARRAY 8 | FLOAT[N] | ARRAY OF VALUE OF COEFFICIENT OF EQUATION 8 |
| ANALYSIS PERIOD | YYYYMMDDHHmmssZ | ANALYSIS RANGE IS DETERMINED AS PERIOD FROM (CURRENT DATE AND TIME) TO (CURRENT DATE AND TIME − ANALYSIS PERIOD) |
| AVERAGE THROUGHPUT CLASS | SI32 | LABEL INDICATING RANGE OF AVERAGE THROUGHPUT |
| DAY OF WEEK LABEL | STRING or SI4 | LABEL INDICATING MONDAY, TUESDAY, WEDNESDAY, THURSDAY, FRIDAY, SATURDAY, SUNDAY, HOLIDAY. SINCE IT IS FOR INTERNAL PROCESSING, EFFICIENT ONE MAY BE USED AS TYPE |
| TIME | SI8 | LABEL INDICATING TIME (24 HOURS). SINCE IT IS FOR INTERNAL PROCESSING, EFFICIENT ONE MAY BE USED AS TYPE |
| NUMBER OF VIEWS | SI32 | NUMBER OF TIMES OF VIEWING AT AVERAGE THROUGHPUT COMPLYING WITH AVERAGE THROUGHPUT CLASS IN THE PERIOD |

FIG. 7A

| FUNC-TION | TABLE AND PARAMETER | DEFAULT SETTING VALUE | MINIMUM VALUE | MAXIMUM VALUE |
|---|---|---|---|---|
| 11 | TIME – CALENDAR INFORMATION CONVERSION TABLE | | | |
| 11 | (DAY OF WEEK, TIME) – CALENDAR INFORMATION CONVERSION TABLE T1 | | | |
| 11 | IP ADDRESS – ISP CONVERSION TABLE T2 | | | |
| 11 | CARRIER NAME – CARRIER IDENTIFIER CONVERSION TABLE T3 | | | |
| 11 | (CALENDAR INFORMATION, NW NAME) – SPEED CONVERSION TABLE T5 | | | |
| 11 | (CALENDAR INFORMATION, USE SERVER) – SPEED CONVERSION TABLE T6 | | | |
| 11 | PAST LOG SEARCH DISTANCE 11_dist (PARAMETER NAME FOLLOWS NAMING CONVENTION) | | | |
| 11 | PAST LOG SEARCH PERIOD 11_time (PARAMETER NAME FOLLOWS NAMING CONVENTION) | | | |
| 11 | PAST LOG SEARCH NUMBER OF ITEMS 11_limit (PARAMETER NAME FOLLOWS NAMING CONVENTION) | 5 | | |
| 11, 21 | RELIABILITY confidence (PARAMETER NAME FOLLOWS NAMING CONVENTION) | | 0 | 100 |

FIG. 7B

| FUNC-TION | TABLE AND PARAMETER | DEFAULT SETTING VALUE | MINIMUM VALUE | MAXIMUM VALUE |
|---|---|---|---|---|
| 11 | USER ACTUAL RESULT CALCULATION FLAG 11_use_user_result (CONFIGURED TO BE ABLE TO INDIVIDUALLY SET WHETHER TO CALCULATE OR NOT FOR FIXED AND MOBILE, IT MAY BE FLAG OF BIT, OR MAY BE SCHEME TO INCREASE PARAMETER) | | | |
| 12 | BUFFERING RULE TABLE | | | |
| 12 | COEFFICIENT TABLE 4, 5 | | | |
| 12 | DR_norm (NORMALIZED VIDEO DURATION) | | | |
| 12 | BR_norm (NORMALIZED BIT RATE) | | | |
| 12 | estimate_unit | | | |
| 12 | IT_dr (int)= 0) | | | |
| 12 | RT_dr (int)= 0) | | | |
| 12 | ST_dr (int)= 0) | | | |
| 13 | COEFFICIENT TABLE 1-3 | | | |
| 13 | ON OFF PARAMETER OF EQUATION 3 | | | |

FIG.7C

| FUNC-TION | TABLE AND PARAMETER | DEFAULT SETTING VALUE | MINIMUM VALUE | MAXIMUM VALUE |
|---|---|---|---|---|
| 14 | RESOLUTION TABLE T8 | | | |
| 14 | FRAME RATE TABLE T9 | | | |
| 15 | CODING BIT RATE TABLE T10 | | | |
| 15 | ANALYSIS PERIOD | | | |
| 15 | MINIMUM VALUE (AVERAGE THROUGHPUT CLASS) | | | |
| 15 | MAXIMUM VALUE (AVERAGE THROUGHPUT CLASS) | | | |
| 15 | WIDTH (AVERAGE THROUGHPUT CLASS) | | | |
| 15 | EACH OFFSET VALUE | | | |
| 16 | CODING PARAMETER TABLE T12 | | | |

FIG. 7D

| FUNC-TION | TABLE AND PARAMETER | DEFAULT SETTING VALUE | MINIMUM VALUE | MAXIMUM VALUE |
|---|---|---|---|---|
| 16 | USER ACTUAL RESULT FLAG | | | |
| 16 | COEFFICIENT TABLE 6 | | | |
| 16 | COEFFICIENT TABLE 7 | | | |
| 16 | COEFFICIENT TABLE 8 | | | |
| 16 | H1 (float >= 0) | | | |
| 16 | H2 (float >= 0) | | | |
| 16 | H3 (float >= 0) | | | |
| 16 | duration_min (int >= 0) | | | |
| 16 | duration_max (int >= 0) | | | |
| 21 | NUMBER OF ITEMS THAT ARE TARGETS OF CALCULATION OF VIEWING LOG 21_log (PARAMETER NAME FOLLOWS NAMING CONVENTION) | | | |
| 21 | NUMBER OF ITEMS THAT ARE CONDITION OF CALCULATION OF VIEWING LOG 21_threshold (PARAMETER NAME FOLLOWS NAMING CONVENTION, NEGOTIABLE) | | | |
| 21 | ABNORMAL VALUE EXCLUSION RATE USED FOR CALCULATION OF VIEWING LOG 21_percentile (PARAMETER NAME FOLLOWS NAMING CONVENTION) | 25 | 0 | 50 |

FIG.7E

| FUNC-TION | TABLE AND PARAMETER | DEFAULT SETTING VALUE | MINIMUM VALUE | MAXIMUM VALUE |
|---|---|---|---|---|
| 22 | VIEWING LOG R | | | |
| 11, 21 | SET UPPER LIMIT VALUE OF THROUGHPUT CALCULATION TARGET upper_percentile | | | |
| 11, 21 | SET LOWER LIMIT VALUE OF THROUGHPUT CALCULATION TARGET lower_percentile | | | |

FIG.8B (DAY OF WEEK, TIME) - CALENDAR INFORMATION CONVERSION TABLE T1

| DAY OF WEEK LABEL | TIME | CALENDAR INFORMATION |
|---|---|---|
| holiday | 0 | 1 |

IP ADDRESS - ISP CONVERSION TABLE T2

| IP ADDRESS | NW NAME |
|---|---|
| xxx.xxx.xxx.xxx/xx | 1 |

CARRIER NAME - CARRIER IDENTIFIER CONVERSION TABLE T3

| CARRIER NAME | CARRIER IDENTIFIER |
|---|---|
| 44010 | 1 |

(CALENDAR INFORMATION, BASE STATION ID) - SPEED CONVERSION TABLE T4

| CALENDAR INFORMATION | BASE STATION ID | THROUGHPUT AVERAGE AVERAGE | THROUGHPUT AVERAGE DEVIATION | THROUGHPUT DEVIATION AVERAGE |
|---|---|---|---|---|
| 1 | [1, 1, 100, 1000] | xxx | yyy | zzz |
| 1 | [1, 1, 100, 10023] | xxx | yyy | zzz |

(CALENDAR INFORMATION, NW NAME) - SPEED CONVERSION TABLE T5

| CALENDAR INFORMATION | NW NAME | THROUGHPUT AVERAGE AVERAGE | THROUGHPUT AVERAGE DEVIATION | THROUGHPUT DEVIATION AVERAGE |
|---|---|---|---|---|
| 1 | 1 | xxx | yyy | zzz |
| 1 | 2 | xxx | yyy | zzz |

(CALENDAR INFORMATION, USE SERVER) - SPEED CONVERSION TABLE T6

| CALENDAR INFORMATION | USE SERVER | THROUGHPUT AVERAGE AVERAGE | THROUGHPUT AVERAGE DEVIATION | THROUGHPUT DEVIATION AVERAGE |
|---|---|---|---|---|
| 1 | fa12737faa0c533fc3bea251d326361165ad54e | xxx | yyy | zzz |
| 1 | d5a1bdf9ce989fd616063e94b92bdeacb94ed23 | xxx | yyy | zzz |

FIG. 16A

FUNCTION 15-4 if T_up < T_min − B  # Case 1
   QoE(T) = S1/RANGE =1
else if T >= T_min − B  # Case 2
   QoE(T) = S2/RANGE
   S2 = (QoE_min−1)/B*(T_up−(T_min−B))^2/2 − (QoE_min−1)/B*(T−(T_min−B))^2/2 + 1*(T_up−T)
else  # Case 3
   QoE(T) = S3/RANGE
   S3 = (QoE_min−1)/B*(T_up−(T_min−B))^2/2 + 1*(T_up−T)

| | |
|---|---|
| T_up | UPPER LIMIT VALUE OF AVERAGE THROUGHPUT CLASS OF AVERAGE THROUGHPUT - QoE TABLE |
| t | (LOWER LIMIT VALUE OF) AVERAGE THROUGHPUT CLASS OF AVERAGE THROUGHPUT - QoE TABLE |
| QoE(T) | QoE WHEN T (CALCULATE FROM THE ABOVE EQUATION) |
| T_min | MINIMUM VALUE OF AVERAGE THROUGHPUT OF Tmp TABLE |
| QoE_min | QoE WHEN T_min (REFERRED FROM Tmp TABLE) |
| B | CONSTANT VALUE PRESET BY CONFIG FILE (FROAT) |

FIG.17A

WHEN THERE IS NO AVERAGE THROUGHPUT OF Tmp TABLE EQUAL TO OR LESS THAN LOWER LIMIT VALUE OF AVERAGE THROUGHPUT CLASS (A[0]<T[0]-B)
QoE OF AVERAGE THROUGHPUT CLASS A[0]
=S1/RANGE=(1*(T[0]-B-A[0])+((QoE[0]-1/2+1)*B+QoE[0]*(A[1]-T[0]))/RANGE  ~S15-51

WHEN THERE IS AVERAGE THROUGHPUT OF Tmp TABLE EQUAL TO OR LESS THAN LOWER LIMIT VALUE OF AVERAGE THROUGHPUT CLASS (EXAMPLE 1)
QoE OF AVERAGE THROUGHPUT CLASS A[1]
=S2/RANGE=(QoE[0]*(T[1]-A[1])+QoE[1]*(A[2]-T[1]))/RANGE  ~S15-52

WHEN THERE IS AVERAGE THROUGHPUT OF Tmp TABLE EQUAL TO OR LESS THAN LOWER LIMIT VALUE OF AVERAGE THROUGHPUT CLASS (EXAMPLE 2)
QoE OF AVERAGE THROUGHPUT CLASS A[3]
=S3/RANGE=(QoE[1]*(T[2]-A[3])+QoE[2]*(T[3]-T[2])+QoE[3]*(A[3]+RANGE-T[3]))/RANGE  ~S15-53

WHEN THERE IS NO AVERAGE THROUGHPUT OF Tmp TABLE EQUAL TO OR LESS THAN LOWER LIMIT VALUE OF AVERAGE THROUGHPUT CLASS (A[0])=T[0]-B)
QoE OF AVERAGE THROUGHPUT CLASS A[0]=S1/RANGE
$S1=(QoE[0]-1)*B/2 - (QoE[0]-1)/B*(A[0]-(T[0]-B))^2/2 + 1*(T[0]-A[0]) + QoE[0]*(A[1]-T[0])$

FIG.26B

VIEWING LOG R

| DATA NAME | DATA NAME | DATA NAME |
|---|---|---|
| USER ID | NUMBER OF TIMES OF VIDEO STOP | OPTION TAG 1 |
| FIXED/MOBILE IDENTIFIER | VIDEO FILE ID | OPTION TAG 2 |
| DATE AND TIME | USE BROWSER | OPTION TAG 3 |
| USE SERVER | USE OS | OPTION TAG 4 |
| IP ADDRESS | wi-fi USE DETERMINATION | OPTION TAG 5 |
| CARRIER NAME | FILE SIZE | OPTION TAG 6 |
| CELL ID | VIDEO BIT RATE | OPTION TAG 7 |
| COORDINATE | CARRIER IDENTIFIER | OPTION TAG 8 |
| MEASURED THROUGHPUT AVERAGE | NW NAME | OPTION TAG 9 |
| MEASURED THROUGHPUT DEVIATION | DISTRIBUTION SERVER GROUP | OPTION TAG 10 |
| SERVICE ID | | |
| DESIGN ID | | |

QUALITY-OF-EXPERIENCE OPTIMIZATION SYSTEM, QUALITY-OF-EXPERIENCE OPTIMIZATION APPARATUS, RECOMMEND REQUEST APPARATUS, QUALITY-OF-EXPERIENCE OPTIMIZATION METHOD, RECOMMEND REQUEST METHOD, AND PROGRAM

TECHNICAL FIELD

The present invention relates to a quality-of-service optimization technique for optimizing quality that a user experiences (QoE: Quality of Experience) in content distribution services.

BACKGROUND ART

Conventionally, as to content distribution methods, following three approaches have been adopted especially for video distribution.

(1) A Method in which a User Selects a Distribution Rate

A method is being considered in which, an interface for setting a distribution rate which has an effect on QoE in the user side is prepared, so that the user sets a distribution rate considering the user's communication environment and the like. In many cases, three patterns of qualities of high/medium/low and the like are prepared for distribution rates. Currently, in video distribution services such as YouTube (registered trade mark), there is an interface by which image quality can be selected (refer to non-patent document 1).

(2) A Method in which a Content Distributor Side Selects a Distribution Rate

In this method, content distribution of quality of low rate is performed in a time zone in which the number of users of the content distribution service is large, and content distribution of higher quality of medium/high rate is performed in a time zone in which the number of users of a content distribution service is small. Accordingly, even in a congested time, it becomes possible to provide services by a quality that can minimally satisfy service users. Also, it becomes possible to provide a high quality service depending on the number of users and premium payment. Currently, in the nico nico video (registered trade mark), a measure is carried out to lower the distribution rate in a congested time for free members (refer to non-patent document 2).

(3) A Method for Selecting a Distribution Rate According to Communication Status In this method, an available band of a user is estimated in some form, so that content is delivered by a bit rate according to the available band. This method is classified to some schemes with respect to the scheme for estimating the available band.

a. Passive Type Estimation Scheme

In the passive type estimation scheme, the available band is estimated from a past communication history and the like.

In this scheme, estimation is performed by utilizing some tendency on the available band. For example, estimation of the available band is performed by using stationarity of time series (refer to non-patent document 3).

b. Active Type Estimation Scheme

In the active type estimation scheme, short communication is performed before distribution, so that the available band is estimated based on communication performance at that time. For example, a packet group, called a packet train, that sequentially becomes large is transmitted before communication, and the available band is estimated based on a change amount of delay to arrival (refer to non-patent document 4).

c. Feedback Scheme

In the feedback scheme, in the middle of distribution, the speed of the communication itself is measured, so that the distribution rate is changed in real time in accordance with the communication speed at that time. This scheme is mainly applied to video distribution in which the distribution rate can be changed in the middle. In video distribution that incorporates this scheme, content is divided into files of a short time unit called a chunk type, network quality (NW quality) and the like are measured between a server and a client for each chunk, and a distribution rate of a chunk that the terminal receives next is determined based on the measurement result, so that the content is distributed. Accordingly, by storing content in a playback buffer of a user terminal and reproducing the content, high quality content distribution becomes available even in a low rate (refer to non-patent documents 5, 6)

RELATED ART DOCUMENT

Non Patent Document

[NON PATENT DOCUMENT 1] "YouTube>help>image quality", [online], YouTube, [Dec. 2, 2014 search], the Internet URL:https://support.google.com/youtube/answer/91449?hl=ja

[NON PATENT DOCUMENT 2] "niconico>help>what is economy mode", [online], niconico video, [Dec. 2, 2014 search], the Internet <URL:http://faq.nicovideo.jp/EokpControl?&tid=11483&event=FE0006>

[NON PATENT DOCUMENT 3] Rich Wolski, Neil T. Spring, and Jim Hayes. "1999. The network weather service: a distributed resource performance forecasting service for metacomputing." Future Genera. Comput. Syst. 15, 5-6 (October 1999), p. 757-768.

[NON PATENT DOCUMENT 4] Ooshiba et. al. "Short time available band estimation echeme for ensuring quality of real time communication", IPSJ Journal, 53(2), 698-711, 2012 February.

[NON PATENT DOCUMENT 5] Hiromoto et. al. "Dynamic coding rate control method suitable for high speed mobile communication network in media streaming", IPSJ Journal, 50(10), p. 2532-2542, 2009 Oct. 1.

[NON PATENT DOCUMENT 6] Sakazawa et. al. "A study on dynamic control of coding rate for tcp video streaming", IEICE Technical Report, IE, image engineering, 102(469), p. 19-24, 2002 Nov. 15.

SUMMARY OF THE INVENTION

Problem to be Solved by the Invention

In the conventional existing methods, there are following problems. In the following, a problem is indicated for each scheme.

(1) The Method in which a User Selects a Distribution Rate

In the scheme in which a user selects a distribution rate, there is an advantage that can set a video distribution rate matching user's preferences, however, there are problems in that quality of experience is deteriorated due to rebuffering that occurs by selecting a distribution rate higher than the actual communication environment, and that it is difficult for the user to set a proper distribution rate according to the communication environment when the user performs viewing in an environment, other than the user's home, such as a visiting place.

(2) The Method in which the Content Distributor Side Selects a Distribution Rate In the method in which the content distributor side selects a distribution rate, a distribution rate can be set according to the distribution side equipment amount. However, since rate control depending on a communication environment for each user is not performed, there is a problem in that a (rebuffering) event occurs in which content video distribution is performed with an excessive rate with respect to the communication environment, or an event occurs in which content distribution is performed with a too small rate.

(3) The Method for Selecting a Content Distribution Rate According to Communication Status a. Passive Type Estimation Scheme Since the passive type estimation scheme requires sufficient past communication histories of end-to-end, it was difficult to prepare sufficient data so far.

b. Active Type Estimation Scheme

In the active type estimation scheme, there is a problem in that content distribution takes much time since the time for measuring the available band before communication is additionally required. The waiting time to communication start largely affects quality of experience in web based applications.

c. Feedback Method

In the distribution scheme, occurrence frequency of rebuffering which accompanies playback stop becomes low. However, since the distribution rate (resolution) fluctuates during video viewing, it is confirmed by subject evaluation that the viewer's QoE is not high. Also, since the distribution rate is set for the purpose of reducing rebuffering, the distribution rate is excessively lowered, causing QoE to be lower than when rebuffering occurs.

The present invention is conceived in view of such problems, and an object of the present invention is to provide a technique to make it possible to store information related to NW quality/QoE for each content distribution, estimate a distribution method for optimizing QoE based on the information, and perform recommendation.

Means for Solving the Problem

A quality-of-experience optimization system of the disclosed technique is a quality-of-experience optimization system configured to optimize quality (QoE: Quality of Experience) that a user experiences in a content distribution service, including:

a recommend request apparatus configured to output a distribution parameter candidate of content distribution for optimizing QoE of content distribution, and to receive a distribution parameter for optimizing the QoE as a recommend value; and a quality-of-experience optimization apparatus configured to estimate QoE from the distribution parameter candidate received from the recommend request apparatus, and to calculate a distribution parameter for optimizing the QoE as a recommend value to output the recommend value.

A quality-of-experience optimization apparatus of the disclosed technique is a quality-of-experience optimization apparatus configured to optimize quality (QoE: Quality of Experience) that a user experiences in a content distribution service, including:

a parameter input output unit configured to input a distribution parameter candidate for content distribution, and to output a recommend value for optimizing QoE; and an estimation value•recommend value calculation unit configured to estimate QoE based on the distribution parameter candidate input by the parameter input output unit, and to calculate a distribution parameter for optimizing the QoE as the recommend value.

A recommend request apparatus of the disclosed technique is a recommend request apparatus for optimizing QoE in a content distribution service, including:

a distribution parameter output unit configured to output a distribution parameter candidate for content distribution, to a quality-of-experience optimization apparatus, in order to request a distribution parameter for optimizing QoE as a recommend value; and a recommend value reception unit configured to receive the recommend value from the quality-of-experience optimization apparatus.

Effect of the Present Invention

According to the disclosed technique, there is provided a technique to make it possible to estimate a distribution method for optimizing QoE based on information related to NW quality/QoE for each content distribution, and perform recommendation.

BRIEF DESCRIPTION OF THE DRAWINGS

FIG. 3 is a diagram for explaining outline of main functions of the quality-of-experience optimization apparatus 1 in the quality-of-experience optimization system;

FIG. 5A is a diagram for explaining an example of definition of input/output data in the OTT interface of the quality-of-experience optimization apparatus 1;

FIG. 5B is a diagram for explaining an example of definition of input/output data in the OTT interface of the quality-of-experience optimization apparatus 1;

FIG. 5C is a diagram for explaining an example of definition of input/output data in the OTT interface of the quality-of-experience optimization apparatus 1;

FIG. 5D is a diagram for explaining an example of definition of input/output data in the OTT interface of the quality-of-experience optimization apparatus 1;

FIG. 5E is a diagram for explaining an example of definition of input/output data in the OTT interface of the quality-of-experience optimization apparatus 1;

FIG. 6A is a diagram for explaining an example of definition of other data used in each function of the quality-of-experience optimization apparatus 1;

FIG. 6B is a diagram for explaining an example of definition of other data used in each function of the quality-of-experience optimization apparatus 1;

FIG. 7A is a diagram showing an example of a list of tables and parameters stored in the storage unit 24 to be referred/updated in each function of the quality-of-experience optimization apparatus 1;

FIG. 7B is a diagram showing an example of a list of tables and parameters stored in the storage unit 24 to be referred/updated in each function of the quality-of-experience optimization apparatus 1;

FIG. 7C is a diagram showing an example of a list of tables and parameters stored in the storage unit 24 to be referred/updated in each function of the quality-of-experience optimization apparatus 1;

FIG. 7D is a diagram showing an example of a list of tables and parameters stored in the storage unit 24 to be referred/updated in each function of the quality-of-experience optimization apparatus 1;

FIG. 7E is a diagram showing an example of a list of tables and parameters stored in the storage unit 24 to be referred/updated in each function of the quality-of-experience optimization apparatus 1;

FIG. 8B is a diagram for explaining processing executed by the throughput estimation function 11 of the quality-of-experience optimization apparatus 1;

FIG. 16A is a diagram for explaining the QoE calculation function 15-4, in the conversion function 15-3 for converting the coding parameter table T12 to the average throughput-QoE table T13, when the average throughput not exceeding the upper limit value of the average throughput class does not exist in the Tmp table T 14 (T<T_min);

FIG. 17A is a diagram for explaining the QoE calculation function 15-5, in the conversion function 15-3 converting from the coding parameter table T12 to the average through-put-QoE table T13, when the average throughput of the Tmp table T14 exists in the range of the average throughput class;

FIG. 18A is a diagram for explaining the QoE calculation function 15-5 when the average throughput of the Tmp table T14 exists in the range of the average throughput class, in the conversion function 15-3 converting the coding parameter table T 12 to the average throughput-QoE table T13;

FIG. 26B is a diagram for explaining processing executed by the viewing log update function 22 of the quality-of-experience optimization apparatus 1.

EMBODIMENTS FOR CARRYING OUT THE INVENTION

In the following, an embodiment of the present invention is described with reference to figures.

Figure 1:
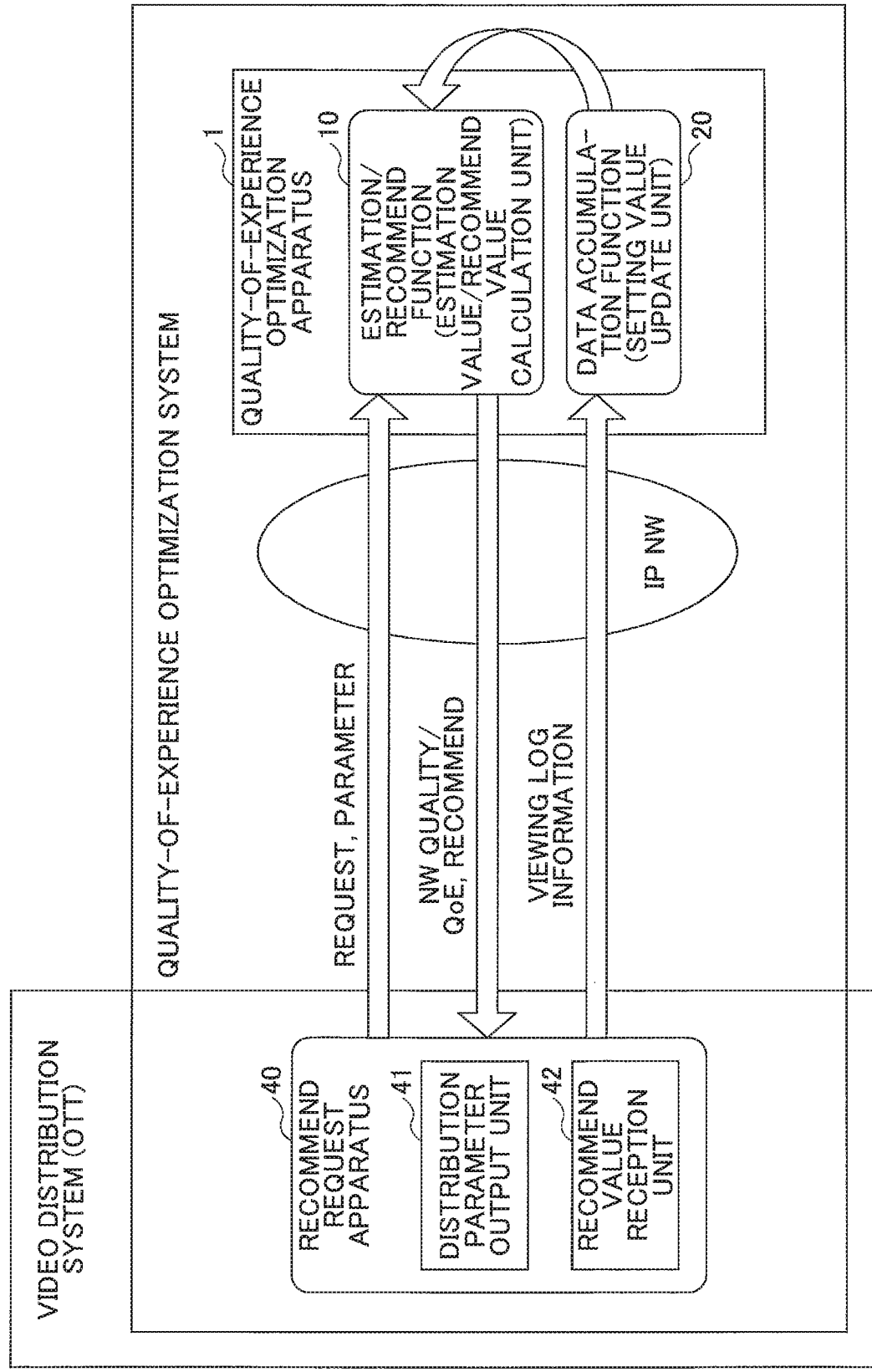
FIG. 1 is a diagram showing system outline of a quality-of-experience optimization system according to an embodiment of the present invention.

FIG. 1 is a diagram showing system outline of a quality-of-experience optimization system according to an embodiment of the present invention.

The quality-of-experience optimization system is formed by two apparatuses which are a "recommend request apparatus 40" configured to request a parameter for performing optimum distribution and a "quality-of-experience optimization apparatus 1" configured to estimate QoE from various distribution parameters and to recommend an optimum parameter, in a video distribution system (to be referred to as OTT (Over-The-Top) hereinafter) of a content distributor.

The recommend request apparatus 40 includes a parameter output unit 41 configured to output, to the quality-of-experience optimization apparatus 1, a distribution parameter candidate for content distribution in order to request a distribution parameter, as a recommend value, for optimizing QoE, and a recommend value reception unit 42 configured to receive the recommend value from the quality-of-experience optimization apparatus 1.

The quality-of-experience optimization apparatus 1 includes two functions which are a "estimation/recommend function (estimation value recommend value calculation unit 10)" and a "data storage function (setting value update unit 20)", and provides the following services to the OTT via an IP network.

(1) Visualization of NW quality/QoE for each content distribution (2) Recommendation of a distribution method to optimize QoE. There are two types of recommendations which are recommendation performed for each content distribution and recommendation performed at design time (periodically).

(3) Storing of information related to NW quality/QoE.

Each of the recommend request apparatus 40 and the quality-of-experience optimization apparatus 1 is provided with a CPU which is a computer, a storage device, an input/output device, and a communication device, so that the CPU controls operation of each device according to the program stored in the storage device to execute various types of functions. Also, as to each of the recommend request apparatus 40 and the quality-of-experience optimization apparatus 1, each unit (each function) may be a hardware circuit (integrated circuit and the like).

As a concrete example of operation of the quality-of-experience optimization system, there is the following operation as an example.

When a user watches a video, a request of the video is transmitted to a video distribution system. At that time, the user transmits user attribute information (example: use place, network use form and terminal information) via an application or a browser.

The video distribution system that received a viewing request of the video transmits, to the quality-of-experience optimization apparatus 1, a coding condition (which includes a distribution rate, a resolution, a frame rate and the like, wherein these may be referred to as distribution parameter candidates) for each of a plurality of image qualities prepared in the video distribution system with respect to the user attribute information and the corresponding video, to inquire about an optimum coding condition.

With respect to the received request, the quality-of-experience optimization apparatus 1 calculates a coding condition by which QoE becomes the largest by using a technique described in detail in the following, and returns the coding condition to the video distribution system as a response.

The video distribution system performs video distribution to the user using the received condition. After viewing the video, the user enters viewing log information (throughput information, network information and the like) as an actual result into the quality-of-experience optimization system.

Accordingly, the newest network quality information continues to be updated, so that highly accurate estimation can be performed.

Figure 2:
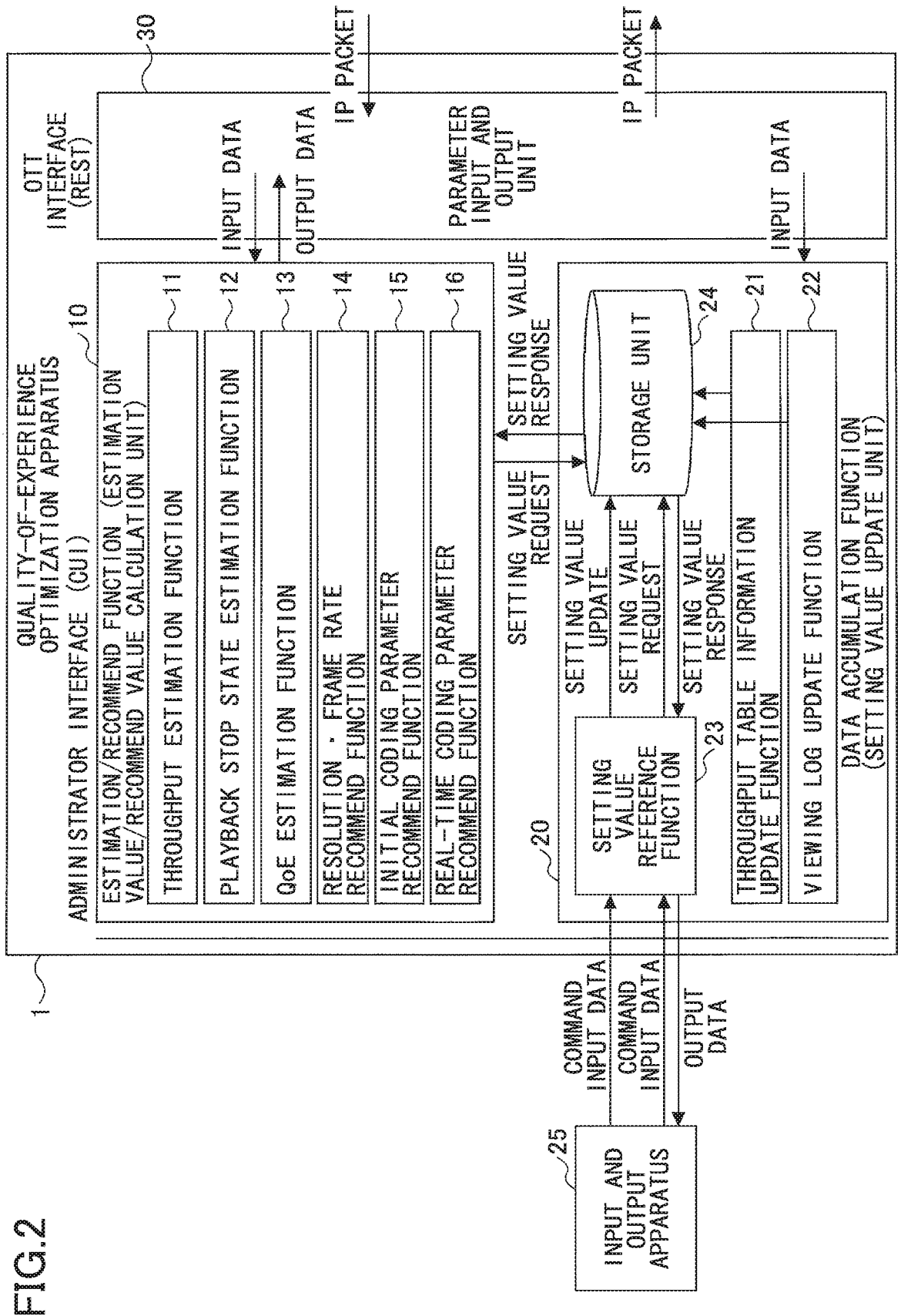
FIG. 2 is a diagram showing a functional configuration of the quality-of-experience optimization apparatus 1 in the quality-of-experience optimization system.

FIG. 2 is a diagram showing a functional configuration of the quality-of-experience optimization apparatus 1 in the quality-of-experience optimization system.

The quality-of-experience optimization apparatus 1 is formed by three of the estimation value•recommend value calculation unit 10, the setting value update unit 20, and the parameter input and output unit 30.

The estimation value•recommend value calculation unit 10 calculates and outputs various kinds of estimation values and recommend values for optimizing QoE based on data from the OTT input via the recommend request apparatus 40 and the IP network, and the viewing log, throughput table, various constant values and the like stored in the storage unit 24 of the setting value update unit 20. The setting value update unit 20 performs information update of the viewing log and the throughput table based on data from the OTT. Also, the setting value update unit 20 updates the setting value of the quality-of-experience optimization apparatus 1 based on input data from a system administrator of the OTT and the quality-of-experience optimization apparatus 1. The parameter input and output unit 30 receives a recommend request from the recommend request apparatus 40 via the IP network and the like, receives a distribution parameter, and transmits a recommend value calculated by the estimation value•recommend value calculation unit 10.

The estimation value•recommend value calculation unit 10 is formed by six functional blocks which are a throughput estimation function 11, a playback stop state estimation function 12, a QoE estimation function 13, a resolution•frame rate recommend function 14, an initial coding parameter recommend function 15 and a real-time coding parameter recommend function 16.

The setting value update unit 20 is formed by three blocks which are a throughput table information update function 21, a viewing log update function 22, and a setting value reference function 23, and by a storage unit 24.

The parameter input and output unit 30 receives and transmits data of an IP packet via an OTT interface with the OTT via the IP network.

The setting value reference function 23 of the setting value update unit 20 inputs a command or data via an administrator interface (CUI; Character User Interface) between the setting value reference function 23 and the input and output apparatus 25 of the system administrator of the quality-of-experience optimization apparatus 1, and outputs data.

FIG. 3 is a diagram for explaining an outline of main functions in the quality-of-experience optimization apparatus 1.

Figure 4:
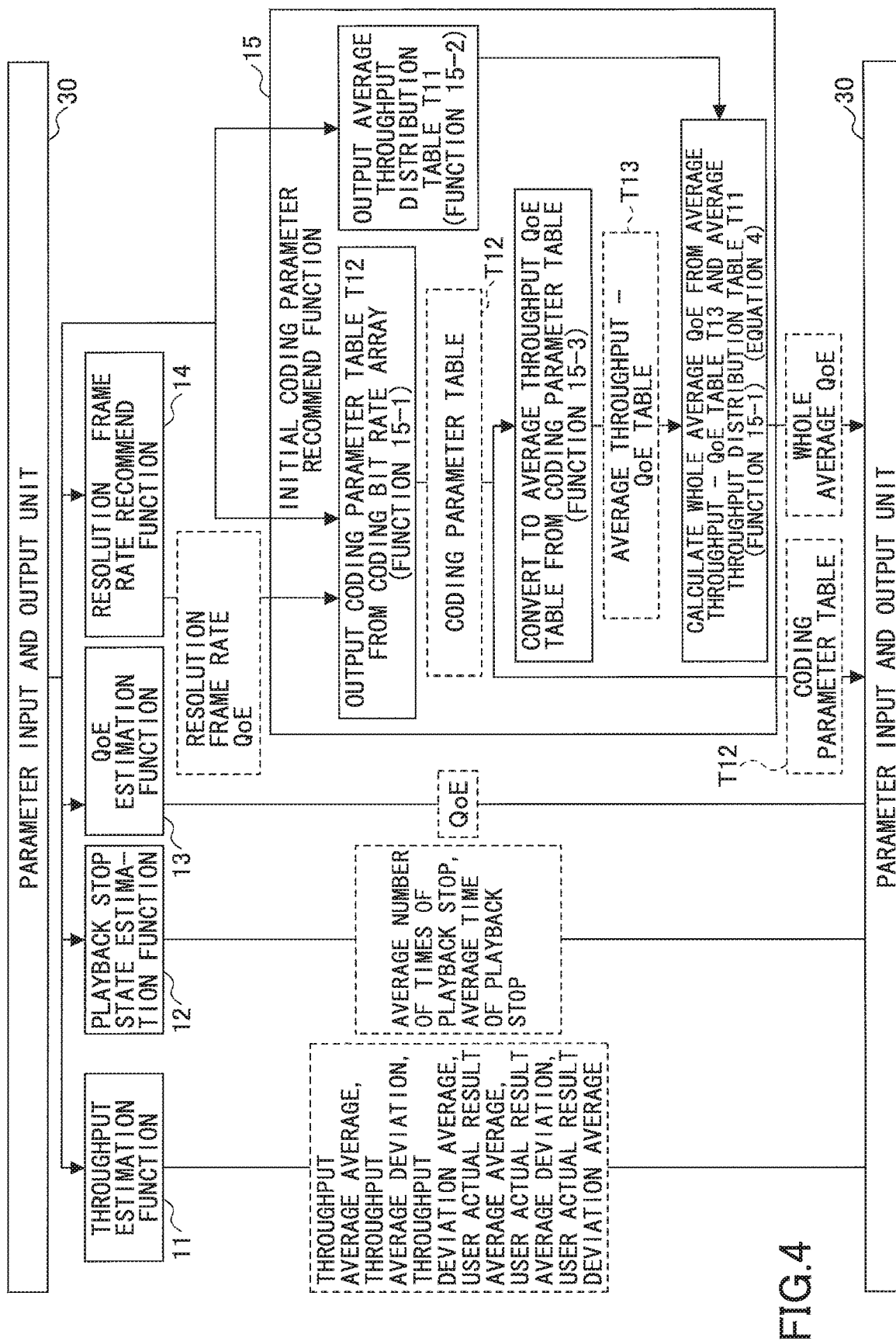
FIG. 4 is a diagram showing a process flow of the quality-of-experience optimization apparatus 1.

FIG. 4 is a diagram showing a process flow of the quality-of-experience optimization apparatus 1.

FIG. 5A is a diagram for explaining an example of the definition of input/output data in the OTT interface of the quality-of-experience optimization apparatus 1.

FIG. 5B is a diagram for explaining definition of input/output data in the OTT interface of the quality-of-experience optimization apparatus 1.

FIG. 5C is a diagram for explaining definition of input/output data in the OTT interface of the quality-of-experience optimization apparatus 1.

FIG. 5D is a diagram for explaining definition of input/output data in the OTT interface of the quality-of-experience optimization apparatus 1.

FIG. 5E is a diagram for explaining definition of input/output data in the OTT interface of the quality-of-experience optimization apparatus 1.

In the definitions of the input/output data in FIGS. 5A to 5E, with respect to each of the input/output data "service ID" . . . "Average playback stop time", "number of times of playback stop" . . . "distribution server group", [data name], [data format], [sample value], [lower limit value,] [upper limit value], [data summary], [related function] are defined. In the [related function], to which function and from which function the corresponding input/output data is input and output between the OTT and the quality-of-experience optimization apparatus 1 is indicated, as for input data, as "Imn" which is a combination of "I" indicating input and a code mn of a function of an input destination, and as for output data, as "Omn" which is a combination of "O" indicating output and a code mn of a function of an output source.

For example, input data "service ID" from the OTT indicates that it is an ID assigned for each distribution service by the OTT, and is input to each function 11~16 of the estimation value•recommend value calculation unit 10 and the viewing log update function 22 of the setting value update unit 20 (I11~I16, I22). Also, "throughput average average" indicates an average value [kbps] of a measured throughput average that is calculated by the throughput estimation function 11 of the estimation value•recommend value calculation unit 10 and is output to the parameter input and output unit 30 (o11).

For the above [data format], "BOOL" is "0" or "1", "SI 32" is a signed 32 bit integer, "UI 32" is an unsigned 32 bit integer, "FLOAT" is a floating point (32 bit), "XXX[N]" is an array of data format of XXX of array size N, "STRING" is a character string.

Also, as to the above [upper limit value] and [lower limit value], if a value exceeds upper and lower limit values of parameters, it is treated as an error, and for "-", the upper limit value and the lower limit value are not set. "CONF" indicates that the upper limit value and lower limit value are set from a config file.

Also, "( )" is an optional parameter. Also, [playback start threshold]>=[playback stop threshold], and [playback restart threshold]>[playback stop threshold] hold true.

FIGS. 6A and 6B are diagrams for explaining definitions of other data used in each function of the quality-of-experience optimization apparatus 1.

In the definitions of other data in FIGS. 6A and 6B, [data name], [data format], and [data summary] are defined for each piece of data "calendar information" . . . "number of views".

FIG. 7A is a diagram showing an example of a list of tables and parameters stored in the storage unit 24 to be referred/updated in each function of the quality-of-experience optimization apparatus 1.

FIG. 7B is a diagram showing an example of a list of tables and parameters stored in the storage unit 24 to be referred/updated in each function of the quality-of-experience optimization apparatus 1.

FIG. 7C is a diagram showing an example of a list of tables and parameters stored in the storage unit 24 to be referred/updated in each function of the quality-of-experience optimization apparatus 1.

FIG. 7D is a diagram showing an example of a list of tables and parameters stored in the storage unit 24 to be referred/updated in each function of the quality-of-experience optimization apparatus 1.

FIG. 7E is a diagram showing an example of a list of tables and parameters stored in the storage unit 24 to be referred/updated in each function of the quality-of-experience optimization apparatus 1.

Regarding the list of tables and parameters in FIGS. 7A to 7E, the column of [function] shows codes of functions for referring to/updating corresponding tables and parameters by associating the codes and the tables and parameters.

For example, the "(day of week, time)-calendar information conversion table T1" in FIG. 7A is referred to by the throughput estimation function 11 of the estimation value•recommend value calculation unit 10. Also, the "resolution table T8" in FIG. 7C is referred to by the resolution•frame rate recommend function 14 of the estimation value•recommend value calculation unit 10. Also, the "Viewing log R" in FIG. 7E is updated by the viewing log update function 22 of the setting value update unit 20.

Here, in each of the functions 11 to 16 in the estimation value•recommend value calculation unit 10 of the quality-of-experience optimization apparatus 1 having the above configuration and each of the functions 21, 22, and 23 in the setting value update unit 20, an outline of processing executed based on various data, tables, and parameters shown in FIG. 5A~FIG. 7E is described.

The throughput estimation function 11 is a function for calculating information related to a throughput from input information of the OTT.

For each content distribution request of a user of a content distribution service, the throughput estimation function 11 inputs various pieces of input data (service ID, design ID, date and time, the following parameters are optional (use server, distribution server group, user ID, fixed/mobile identifier, server speed control, [IP address or carrier name], [cell ID or coordinate], wi-fi use determination)) via the OTT interface (FIG. 2) of the parameter input and output unit 30 from the OTT through the IP network, and calculates and outputs information on throughput [throughput average average, throughput average deviation, throughput deviation average, user actual result average average, user actual result average deviation, user actual result deviation average].

Details of processing by the throughput estimation function 11 are described with reference to after-mentioned FIGS. 8A and 8B.

The playback stop state estimation function 12 is a function for calculating information related to playback stop from input information of the OTT and information related to the throughput.

For each content distribution request of a user of a content distribution service, the playback stop state estimation function 12 receives various pieces of input data (service ID, design ID, coding bit rate, average throughput, throughput deviation, video duration, following parameters are optional (playback start threshold, playback restart threshold, playback stop threshold)) via the OTT interface (FIG. 2) of the parameter input and output unit 30 through the IP network from the OTT, and calculates and outputs an average number of times of playback stop and average playback stop time by using coefficients (coefficient tables 4 and 5) stored in the storage unit 24 for the internal system beforehand.

Details of processing by the playback stop state estimation function 12 are described with reference to after-mentioned FIG. 9, and equations 5 and 6.

The QoE estimation function 13 is a function for calculating QoE from information related to coding.

For each content distribution request of a user of a content distribution service, the QoE estimation function 13 receives various pieces of input data (service ID, design ID, coding bit rate, resolution, frame rate, following parameters are optional (number of times of playback stop, array of playback stop time length)) via the OTT interface (FIG. 2) of the parameter input and output unit 30 through the IP network from the OTT, and calculates and outputs QoE.

Details of processing by the QoE estimation function 13 are described with reference to after-mentioned FIG. 10, and equations 1, 2 and 3.

The resolution•frame rate recommend function 14 is a function for calculating a resolution and a frame rate by which QoE becomes the largest from the coding bit rate.

The resolution•frame rate recommend function 14 is executed each time when designing/redesigning (encoding etc.) of the content distribution service is performed, and the resolution•frame rate recommend function 14 receives various pieces of input data (service ID, design ID, coding bit rate, following parameters are optional (number of times of playback stop, array of playback stop time length, resolution array, frame rate array)) via the OTT interface (FIG. 2) of the parameter input and output unit 30 through the IP network from the OTT, and calculates and outputs a resolution, a frame rate and QoE.

Details of processing by the resolution•frame rate recommend function 14 are described with reference to after-mentioned FIG. 11.

The initial coding parameter recommend function 15 is a function for calculating a coding parameter by which average QoE of the whole users (whole average QoE) becomes the largest.

The initial coding parameter recommend function 15 is executed each time when designing/redesigning (encoding etc.) of a content distribution service is performed, and the initial coding parameter recommend function 15 receives various pieces of input data (service ID, design ID, number of encodes, following parameter is optional (coding bit rate array)) via the OTT interface (FIG. 2) of the parameter input and output unit 30 through the IP network from the OTT, and calculates and outputs a whole average QoE and a coding parameter table T12.

Details of processing by the initial coding parameter recommend function 15 are described with reference to after-mentioned FIGS. 12~18, and the equation 4.

The real-time coding parameter recommend function 16 is a function for calculating information related to coding parameters from input information of the OTT.

For each content distribution request of a user of a content distribution service, the real-time coding parameter recommend function 16 receives various pieces of input data (service ID, design ID, date and time, following parameters are optional (use server, distribution server group, user ID, fixed/mobile identifier, server speed control, [IP address or carrier name], [cell ID or coordinate], wi-fi use determination, OTT coding parameter table, video duration, playback start threshold, playback restart threshold, playback stop threshold)) via the OTT interface (FIG. 2) of the parameter input and output unit 30 through the IP network from the OTT, and calculates a resolution, a frame Rate, a coding bit rate, and a QoE, a local average QoE, and outputs inputs and outputs as a log. Note that the local average QoE corresponds to an average QoE of all users in the same network environment as the user who is the target of recommendation.

Details of processing by the real-time coding parameter recommend function 16 are described with reference to after-mentioned FIGS. 19~24, and equations 7~10.

The throughput table information update function 21 is a function for updating throughput tables ("(calendar information, base station ID)-speed conversion table T4", "(cal-endar information, NW name)-speed conversion table T5" or "(calendar information, use server)-speed conversion table T6").

The update cycle is based on the time of system operation, and, for example, by being automatically launched about once in 1~5 minutes, the throughput table information update function 21 updates the update target table based on update target designation information (calendar information, use server, NW name) of input information from the OTT.

Details of processing by the throughput table information update function 21 are described with reference to after-mentioned FIG. 25.

The viewing log update function 22 is a function for newly creating/updating a viewing log R.

When there is input data (user ID, fixed/mobile identifier, date and time, use server, distribution server group, IP address, carrier name, cell ID, coordinates, measured throughput average, measured throughput deviation, service ID, design ID, number of times of video stop, video file ID, use browser, use OS, wi-fi use judgment, file size, video bit rate, carrier identifier, NW name, option tags 1~10) as input information of the OTT, the viewing log update function 22 performs new addition or update to the viewing log R stored in the storage unit 24.

Details of processing by the viewing log update function 22 are described with reference to after-mentioned FIG. 26.

The setting value reference function 23 is a function for referring to and updating setting values (FIG. 7A~FIG. 7E) of the tables/parameters/coefficients (constants) and the like stored in the storage unit 24. Based on input data from the OTT and command data from a system administrator of the quality-of-experience optimization apparatus 1, the setting value reference function 23 updates the setting values used in each function of the quality-of-experience optimization apparatus 1.

In the quality-of-experience optimization apparatus 1 configured as described above, the CPU controls operation of each unit according to commands described in a program which governs each function stored in the storage device, and software and hardware operate by cooperating with each other, so that the throughput estimation function 11, the playback stop state estimation function 12, the QoE estimation function 13, the resolution-frame rate recommend function 14, the initial coding parameter recommend function 15, the real-time coding parameter recommend function 16, the throughput table information update function 21, the viewing log update function 22, and the setting value reference function 23, as described in the after-mentioned operation description, are realized. Also, as described before, each of the throughput estimation function 11, the playback stop state estimation function 12, the QoE estimation function 13, the resolution•frame rate recommend function 14, the initial coding parameter recommend function 15, the real-time coding parameter recommend function 16, the throughput table information update function 21, the viewing log update function 22, and the setting value reference function 23 can be realized as a hardware circuit incorporating the processing.

Next, detailed operation of processing executed in each function of the quality-of-experience optimization apparatus 1 having the above configuration is described.

(Throughput Estimation Function 11)

The technique used by the throughput estimation function 11 in the present embodiment is a technique for estimating a current throughput from past viewing logs (throughput actual result values) of a user's network environment.

Because communication traffic depends on user's behavior, it shows steady variation with respect to day of week and time. Therefore, the same degree of congestion is obtained on the same network in the same time zone of the same weekday/holiday, and the throughput becomes the same degree. Therefore, in the present technology, use network information and time zone information are input, so that an average/deviation of throughputs is calculated by referring to a viewing log database of a use base station/ISP. Detailed processing is described below.

Figure 8A:
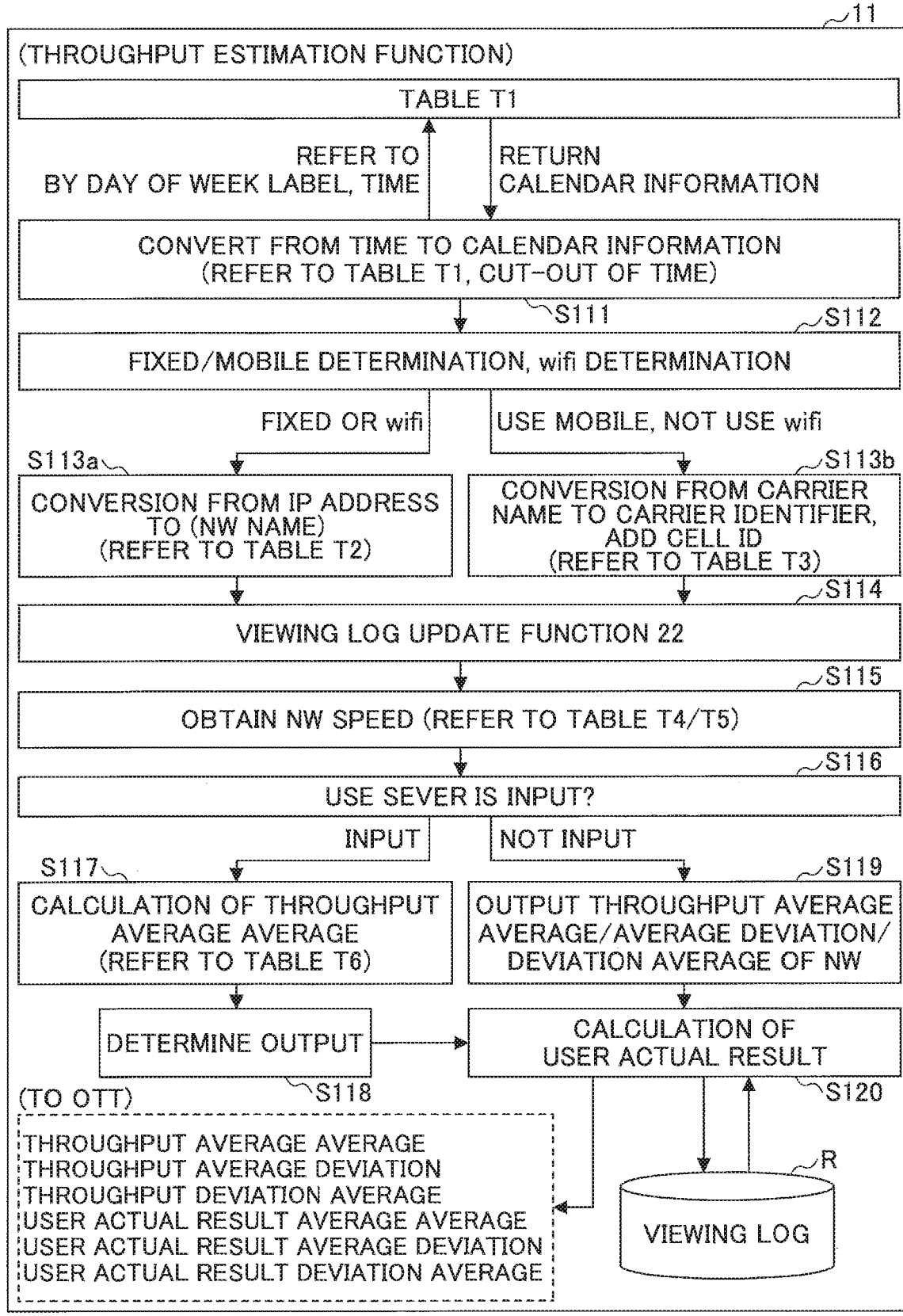
FIG. 8A is a diagram for explaining processing executed by the throughput estimation function 11 of the quality-of-experience optimization apparatus 1.

FIG. 8A and FIG. 8B are diagrams for explaining processing executed by the throughput estimation function 11 of the quality-of-experience optimization apparatus 1. FIG. 8A mainly shows a procedure of processing, and FIG. 8B shows an example of tables used in the procedure.

For each content distribution request of a user of a content distribution service, when various pieces of input data are input from the content distribution server of the OTT via the parameter input and output unit 30, first, a day-of-week label is acquired from the input year/month/day and time, and conversion to calendar information according to the corresponding day-of-week label and time is performed in accordance with the (day of week, time)-calendar information conversion table T1 (step S11).

As for the selection of the day-of-week label from the year/month/day, the throughput estimation function 11 can select the day-of-week label that matches the year/month/day by matching with calendar information and the like. As for the selection of the day-of-week label from the year/month/day, when the year/month/day is a holiday, a label indicating a holiday is selected, and in other cases, a label indicating a day of week (Sunday to Saturday) is selected.

Also, there are following pieces of input data as data common to mobile and fixed: service ID, design ID, date and time (year/month/day, time), optional parameters (use server, distribution server group, user ID, fixed/mobile identifier, server speed control).

As input data of fixed only, there is an IP address (or carrier name). As for input data of mobile only, there are wi-fi use determination data, and carrier name and cell ID (or coordinates or both) as data when wi-fi use determination is false, and IP address as data when wi-fi use determination is true. It is acceptable even if unnecessary information is included in the input data because it is input to the viewing log update function 22.

Next, on the basis of the input data, it is determined whether the user's terminal is a fixed terminal or a wi-fi use terminal or a mobile terminal (mobile) not using wi-fi (step S112).

When it is determined that the user's terminal is a fixed terminal or a wi-fi use terminal, the IP address of the user terminal is converted into a NW name according to the IP address-ISP conversion table T2 (step S113a).

When it is determined that the user's terminal is a mobile terminal not using wi-fi, the carrier name corresponding to the user terminal is converted into a carrier identifier according to the carrier name-carrier identifier conversion table T3, and a cell ID is given (step S113b).

Here, the content of the viewing log R corresponding to the input data stored in the storage unit 24 is updated by the viewing log update function 22 of the setting value update unit 20 (step S114).

Then, a NW speed (throughput average average/average deviation/deviation average) is acquired according to the (calendar information, base station ID)-speed conversion table T4 or the (calendar information, NW name)-speed conversion table T5 (step S115).

Here, it is determined whether or not a use server has been input as input data (step S116).

When the use server has been input, it is determined whether or not server speed control information has been input as input data, and when the server speed control information has been input, the value of the server speed control information is set as a throughput average average of the server and the throughput average deviation and deviation average are set to "0". When the server speed control information has not been input, the throughput average average, the throughput average deviation, and the throughput deviation average of the use server are set according to the (calendar information, use server)-speed conversion table T6 (step S117).

The throughput average average of the NW acquired in step S115 and the throughput average average of the use server obtained in step S117 are compared, so that the smaller one of the throughput average averages, and the throughput average deviation and the throughput deviation average corresponding to the smaller one are made to be output targets (step S118).

When the use server has not been input, the throughput average average, the throughput average deviation and the throughput deviation average of the NW obtained in step S115 are made to be output targets (step S119).

Then, in the next process step S120, throughput average average/throughput average deviation/throughput deviation average of the user actual result are calculated.

In the case where the user terminal is a fixed terminal or a wi-fi use terminal, in the viewing log R stored in the storage unit 24, when there are logs, the number of which is equal to or greater than the calculation number of past logs (11_limit), whose elapsed time is within the past log search period (11_time), having measured throughput average and measured throughput deviation, and having the same (user ID, distribution server group, NW name, calendar information), throughput calculation is performed for the latest calculation number (11_limit) of the user's viewing logs.

In this throughput calculation, an average value of the measured throughput averages is calculated as a user actual result average average, a deviation of the measured throughput averages is calculated as a user actual result average deviation, and an average value of the measured throughput deviations is calculated as a user actual result deviation average.

In the case where the user terminal is a mobile terminal not using wi-fi and there are coordinates as the input data, in the viewing log R stored in the storage unit 24, when there are logs, the number of which is equal to or greater than the calculation number of past logs (11_limit), whose elapsed time is within the past log search period (11_time), having measured throughput average and measured throughput deviation, and having the same (user ID, carrier identifier, calendar information, distance within search distance (11_dist) of past log), throughput calculation similar to the before-mentioned one is performed for the latest calculation number (11_limit) of the user's viewing logs.

In the case where the user terminal is a mobile terminal (mobile) not using wi-fi and there are not coordinates as the input data, in the viewing log R stored in the storage unit 24, when there are logs, the number of which is equal to or greater than the calculation number of past logs (11_limit), whose elapsed time is within the past log search period (11_time), having measured throughput average and measured throughput deviation, and having the same (user ID, distribution server group, cell ID information (base station ID), calendar information), throughput calculation similar to the before-mentioned one is performed for the latest calculation number (11_limit) of the user's viewing logs.

The value obtained by the above calculation is set as the user actual result. However, according to the calculation flag of the user actual result (11_use_user_result), depending on a calculation target user, this process (S120) is skipped so that throughput average average/average deviation/deviation average of the user actual result is not output.

In this manner, the throughput average average, the throughput average deviation, the throughput deviation average estimated by step S118 or S119 and made to be as output targets, and the user actual result average average, the user actual result average deviation, and the user actual result deviation average calculated in S120 are output to the OTT.

In the throughput estimation function 11, when there is not a part of input information, the following actions are taken.

Date and time: return error code.

User ID: proceed regarding that the viewing log search function to be No.

Fixed/mobile identifier: treated as fixed.

There is no IP address even though fixed: return error code.

There is no wi-fi use determination even though mobile: return an error code.

Although wi-fi use determination is true in mobile, there is no IP address: return error code.

Although wi-fi use determination is false in mobile, there is no carrier name: return error code.

Although wi-fi use determination is false in mobile, there is neither coordinate nor cell ID: return error code.

When all of essential input parameters (date/time, user ID, service ID, design ID) of the viewing log update function 22 are present, the viewing log update function 22 is executed even when other information is insufficient.

Further, in the throughput estimation function 11, when the calculation result does not satisfy a reference value, the following actions are taken.

When any value cannot be acquired during mobile speed calculation: return error code.

When user actual result average deviation cannot be acquired: not add user actual result average average, user actual result average deviation, user actual result deviation average.

Further, in the throughput estimation function 11, when there is no entry in tables, the following actions are taken.

(day of week, time)-calendar information conversion table T1: return error code.

IP address-ISP conversion table T2 and carrier name-carrier identifier conversion table T3: return error code, and notify the administrator of the value not found by searching.

(calendar information, NW name)-speed conversion table T5: return error code.

(calendar information, use server)-speed conversion table T6: return error code.

(Playback Stop State Estimation Function 12)

The playback stop state estimation technique in the playback stop state estimation function 12 of the present embodiment is a technique to estimate the number of times of playback stop/playback stop time from a throughput average/deviation, a coding bit rate, a video length (duration), a playback start threshold/playback stop threshold/playback restart threshold that are output values of a throughput estimation technique. Regarding the mechanism of playback stop, for example, in progressive download type video distribution, a terminal has a buffer for accumulating received data, and operations of playback start, stop, and restart are determined according to the remaining amount of the buffer. For example, when the buffer amount decreases to the playback stop threshold value, playback stops, and when the buffer amount reaches the playback restart threshold value in the stop state, playback is restarted. In the present technique, by executing simulation and the like, a model equation for estimating a playback stop state is constructed, and playback stop state estimation is performed using the model equation.

In the model equation shown below as equations, a throughput average/deviation, a coding bit rate, a video length (duration), a playback start threshold/a playback stop threshold/a playback restart threshold are input, so that the number of times of playback stop and the playback stop time are obtained. Note that each equation used in the present embodiment is an example, and other equations may be used.

Figure 9:
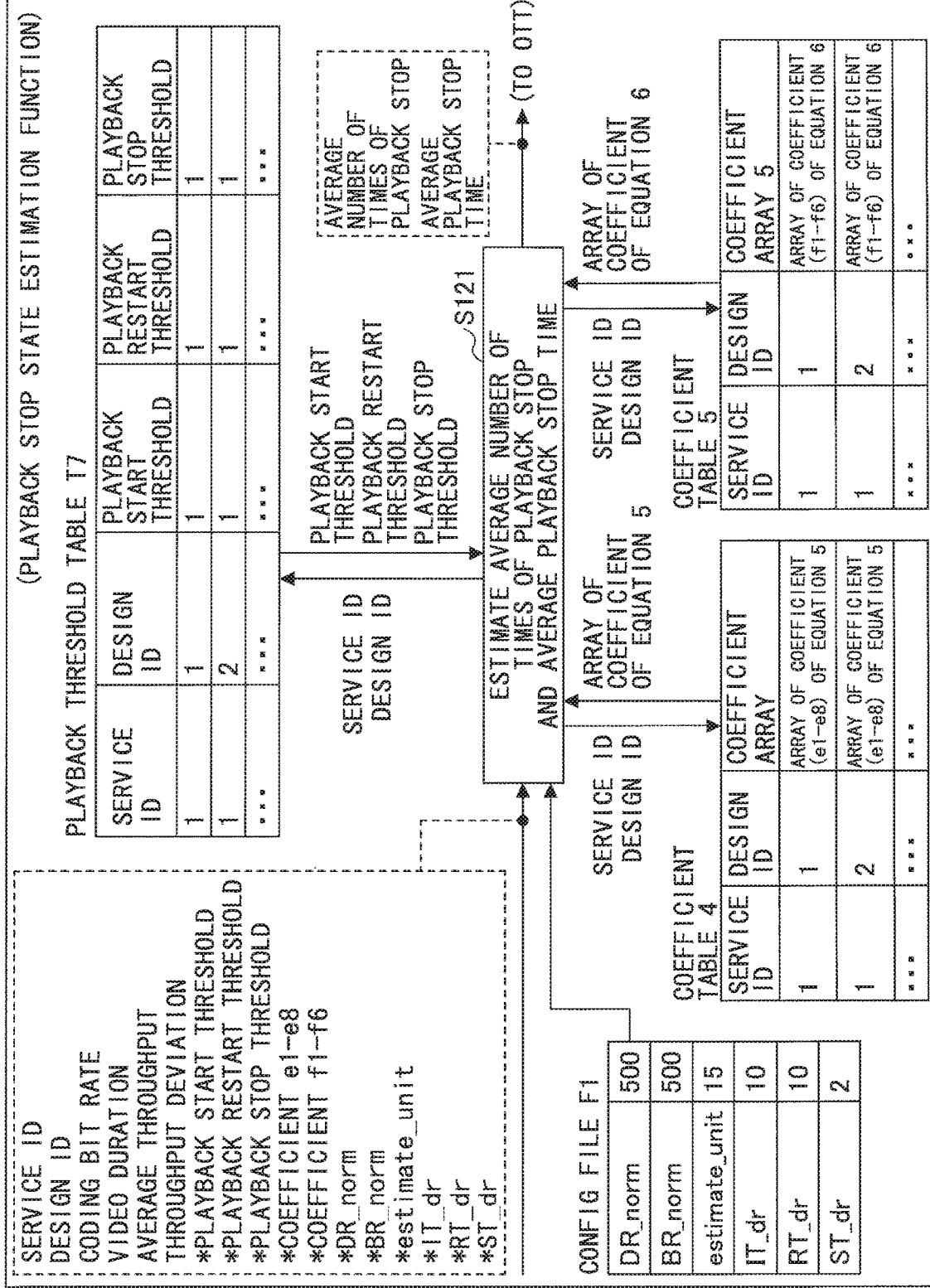
FIG. 9 is a diagram for explaining processing executed by the playback stop state estimation function 12 of the quality-of-experience optimization apparatus 1.

FIG. 9 is a diagram for explaining processing executed by the playback stop state estimation function 12 of the quality-of-experience optimization apparatus 1.

For each content distribution request of a user of a content distribution service, when various pieces of data (service ID, design ID, coding bit rate, average throughput, throughput deviation, video duration, following parameters are optional (playback start threshold, playback restart threshold, playback stop threshold, coefficients e1~e8, coefficients f1~f6, DR_norm (normalized video duration), BR_norm (normalized bit rate), estimate_unit, IT_dr, RT_dr, ST_dr)) are input via the parameter input and output unit 30 from the content distribution server of the OTT, an average number of times of playback stop SC and an average playback stop time SL are estimated according to the following equation 5, equation 6, and equation 5·6, and they are output to the OTT (step S121).

EQUATION 5

$$SC = SC_{max} - \left(\frac{SC_{max} - X'_{sc}}{SC_{max}^{1-b_{sc}}}\right)^{\frac{1}{b_{sc}}} \quad (5-1)$$

$$X'_{sc} = \begin{cases} 0 & \text{if } X_{sc} < 0 \\ X_{sc} & \text{else} \end{cases} \quad (5-2)$$

$$X_{sc} = \frac{(BR_{norm} - T_{norm}) * DR_{norm} - (IT_{norm} - RT_{norm})}{RT_{norm} - ST_{norm}} \quad (5-3)$$

$$SC_{max} = \frac{BR_{norm} * DR_{norm} - (IT_{norm} - RT_{norm})}{RT_{norm} - ST_{norm}} \quad (5-4)$$

$$b_{sc} = e_1 - (e_1 - e_2) \cdot \exp\left(-1 \cdot \left(k \cdot \frac{T_{stdnorm}}{T_{norm}}\right)^d\right) \quad (5-5)$$

$k = e_3 \cdot \exp(-e_4 \cdot DR) + e_5 \quad \leftarrow DR \text{ INSTEAD OF DR\_norm}$ $d = e_6 \cdot \exp(-e_7 \cdot DR) + e_8 \quad \leftarrow DR \text{ INSTEAD OF DR\_norm}$

EQUATION 6

$$SL = \frac{B_{SL}X_{SL} + B_{SL}\sqrt{X_{SL}^2 + b_{SL}^2(B_{SL}^2 - 1)}}{B_{SL}^2 - 1} * \frac{DR}{DR_{norm}} \quad (6-1)$$

$$X_{SL} = \frac{BR_{norm} * DR_{norm} - IT_{norm}}{T_{norm}} - DR_{norm} \quad (6-2)$$

$$B_{SL} = f_1 + \frac{f_2 - f_1}{1 + \exp\left(\frac{\frac{T_{std\,norm}}{T_{norm}} - f_3}{f_4}\right)} \quad (6-3)$$

-continued $$b_{SL} = f_5 \cdot \left(\frac{T_{std\ norm}}{T_{norm}}\right)^2 + f_6 \cdot \frac{T_{std\ norm}}{T_{norm}} \quad (6-4)$$

EQUATION 5·6

$$T_{norm} = T * \frac{BR_{norm}}{BR}$$

$$T_{std\ norm} = T_{std} * \frac{BR_{norm}}{BR}$$

$$IT_{norm} = IT_{dr} * BR * \frac{DR_{norm} * BR_{norm}}{DR * BR}$$

$$RT_{norm} = RT_{dr} * BR * \frac{DR_{norm} * BR_{norm}}{DR * BR}$$

$$ST_{norm} = ST_{dr} * BR * \frac{DR_{norm} * BR_{norm}}{DR * BR}$$

In the above equations, SC is the average number of times of playback stop, SL is the average playback stop time, T is an average throughput, T_std is a throughput deviation, BR is a coding bit rate, DR is a video duration, and IT is a playback start threshold. Also, RT is a playback restart threshold, ST is a playback stop threshold, e1~e8 are constants, f1~f6 are constants, DR_norm is a normalized video duration, BR_norm is a normalized bit rate, and EU is an estimation unit.

When the playback start/restart/stop threshold are not input in step S121, the playback start threshold IT, the playback restart threshold RT, and the playback stop threshold ST are obtained from the playback threshold table T7 based on the service ID and the design ID.

When coefficients e1~e8 and coefficients f1~f6 are not input, coefficients e1~e8 of the equation 5 are acquired from the coefficient table 4 based on the service ID and the design ID, and coefficients f1~f6 of the equation 6 are obtained from the coefficient table 5.

Also, when DR_norm, BR_norm, estimate_unit, IT_dr, RT_dr, and ST_dr are not input, the DR_norm, BR_norm, estimate_unit, IT_dr, RT_dr, ST_dr are acquired from the config file F1.

Then, from the input information, using the formula 5, the average number of times of playback stop SC is estimated, and from the input information, the average playback stop time SL is estimated using the equation 6.

When the output value of the above equation is an exception value, it is treated as an error.

(QoE Estimation Function 13)

The QoE estimation technique of the present embodiment is a technique for estimating QoE from a coding bit rate, a resolution, and a frame rate. In the present technique, for example, a relationship between QoE and various coding bit rates/resolutions/frame rates is obtained by subjective evaluation experiment and the like, and the relationship is expressed as a model equation. As a concrete example is shown by the following equations (model equation), QoE can be calculated by inputting a coding bit rate, a resolution, and a frame rate to the model equation. Also, as shown in the equation 2 and the like, QoE can be calculated also in consideration of the number of times of playback stop and the playback stop time length. Note that each equation used in the present embodiment is an example, and other equations may be used.

Figure 10:
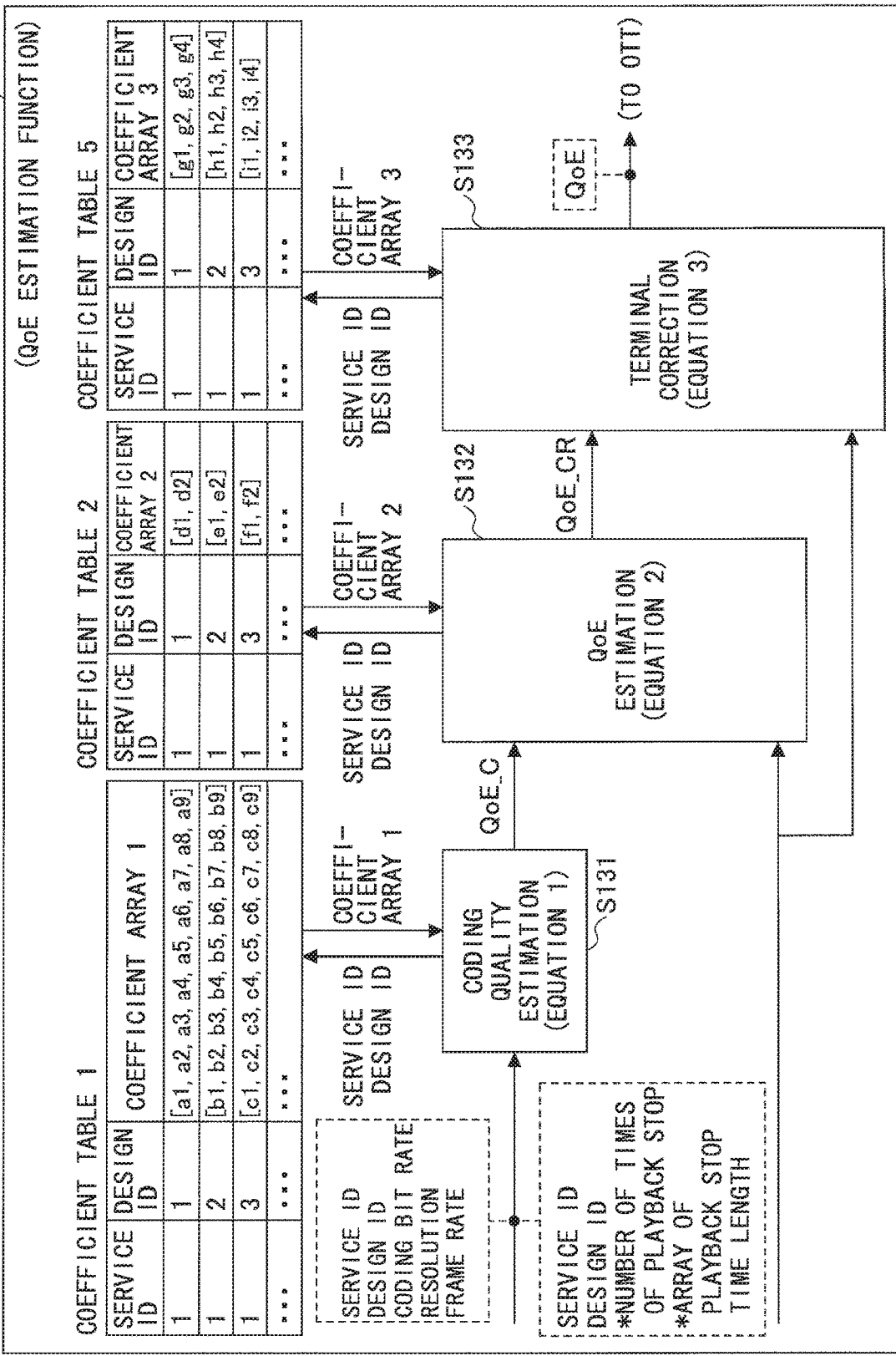
FIG. 10 is a diagram for explaining processing executed by the QoE estimation function 13 of the quality-of-experience optimization apparatus 1.

FIG. 10 is a diagram for explaining processing executed by the QoE estimation function 13 of the quality-of-experience optimization apparatus 1.

For each content distribution request of a user of a content distribution service, when various pieces of input data (service ID, design ID, coding bit rate, resolution, frame Rate, following parameters are optional (number of times of playback stop, array of playback stop time length)) are input via the parameter input and output unit 30 from the content distribution server of the OTT, first, the coefficient array 1 is acquired from the coefficient table 1 based on the service ID and the design ID, and QoE_C (intermediate parameter) is calculated according to the following equation 1 (coding quality estimation) (step S131).

EQUATION 1

$$QoE\_C = 1 + V_1 \cdot \left(1 - \exp\left(-\frac{bpp}{V_2}\right)\right), \quad (1\text{-}1)$$

$$V_1 = (a_1 \cdot \log(RS) + a_2 \cdot FR + a_3) \cdot \left(1 - a_4 \cdot RS \cdot \exp\left(-\frac{FR}{a_5}\right)\right), \quad (1\text{-}2)$$

$$V_2 = (b_1 \cdot FR + b_2) \cdot RS^{b_3} + b_4, \quad (1\text{-}3)$$

$$bpp = \frac{\text{bitrate}}{RS \cdot FR} \quad (1\text{-}4)$$

In the above equation, bitrate is an coding bit rate, RS is a resolution, FR is a frame rate, and $a_1$~$a_5$, $b_1$~$b_4$ are constants.

If the playback stop time length array is not input when the number of times of playback stop is equal to or greater than 1, it is processed as an error.

Next, based on the service ID and the design ID, the coefficient array 2 is acquired from the coefficient table 2, and based on the coefficient array 2 and the QoE_C calculated by the equation 1 and the input data, QoE_CR (intermediate parameter) is calculated according to the following equation 2 (QoE estimation) (step S132).

EQUATION 2

$$QoE\_CR = (QoE\_C - 1) \cdot (1 - \text{Min}(DR, 1)) + 1 \quad (2\text{-}1)$$

$$DR = c_1 \cdot \sum_{i=0}^{n-1} c_2' \cdot \log(RL_i + 1) \quad (2\text{-}2)$$

In the above equation, Min(A, B) is a function that returns a smaller value of A and B, n is the number of times of playback stop, and $RL_i$ is a time length of i-th occurred playback stop. $c_1$, $c_2$ are constants.

Here, when the number of times of playback stop is "0", or when there is no input of the number of times of playback stop and the playback stop time length array, n=0 (DR=0) is used as for the equation 2.

Next, based on the service ID and the design ID, the coefficient array 3 is acquired from the coefficient table 3, and based on the QoE_CR calculated by the coefficient array 3 and the equation 2 and the input data, QoE is calculated according to the following equation 3 (terminal correction), and is output to the OTT as an estimated QoE (step S133).

$$QoE = (1-r) \cdot (d_1 \log(QoE\_CR) + d_2) + r \cdot (d_3 \cdot QoE\_CR + d_4) \quad \text{EQUATION 3}$$

In the above equation, r is 1 when there is a playback stop, is 0 when there is no playback stop, and $d_1$~$d_i$ are constants.

Here, when there is no input of the number of times of playback stop and the playback stop time length array, r=0 is set with respect to the equation 3.

It is also possible to have a function of turning the above equation 3 OFF (QoE=QoE_CR) by setting of a config file.

(Resolution·Frame Rate Recommend Function 14)

Figure 11:
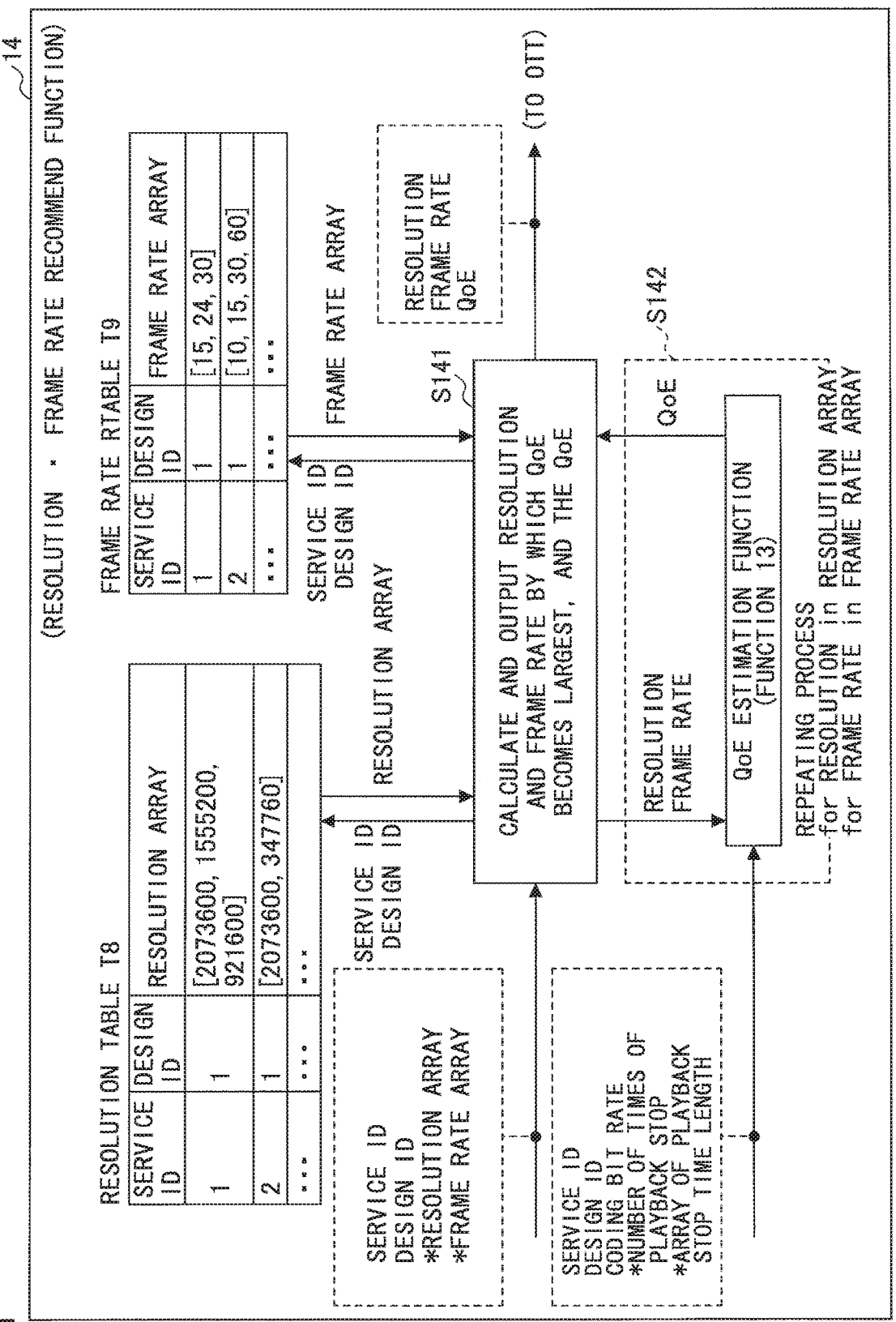
FIG. 11 is a diagram for explaining processing executed by the resolution•frame rate recommend function 14 of the quality-of-experience optimization apparatus 1.

FIG. 11 is a diagram for explaining processing executed by the resolution·frame rate recommend function 14 of the quality-of-experience optimization apparatus 1.

For each content distribution request of a user of a content distribution service, when various pieces of input data (service ID, design ID, coding bit rate, the following parameters are optional (number of times of playback stop, playback stop time length, resolution array, frame rate array)) are input via the parameter input and output unit 30 from the content distribution server of the OTT, a resolution, a frame rate, and a QoE to be recommended are calculated and output to the OTT (step S141).

Here, the QoE estimation process by the QoE estimation function 13 (see FIG. 10) is repeatedly executed (step S142) for all pairs of resolutions and frame rates included in the input resolution array and frame rate array, so that a resolution and a frame rate by which the QoE becomes the largest, and the QoE are output.

When there is no resolution array as the input data, a resolution array corresponding to the service ID and the design ID is acquired from the resolution table T8.

Also, when there is no frame rate array as the input data, a frame rate array corresponding to the service ID and the design ID is acquired from the frame rate table T9.

(Initial Coding Parameter Recommend Function 15)

Figure 12:
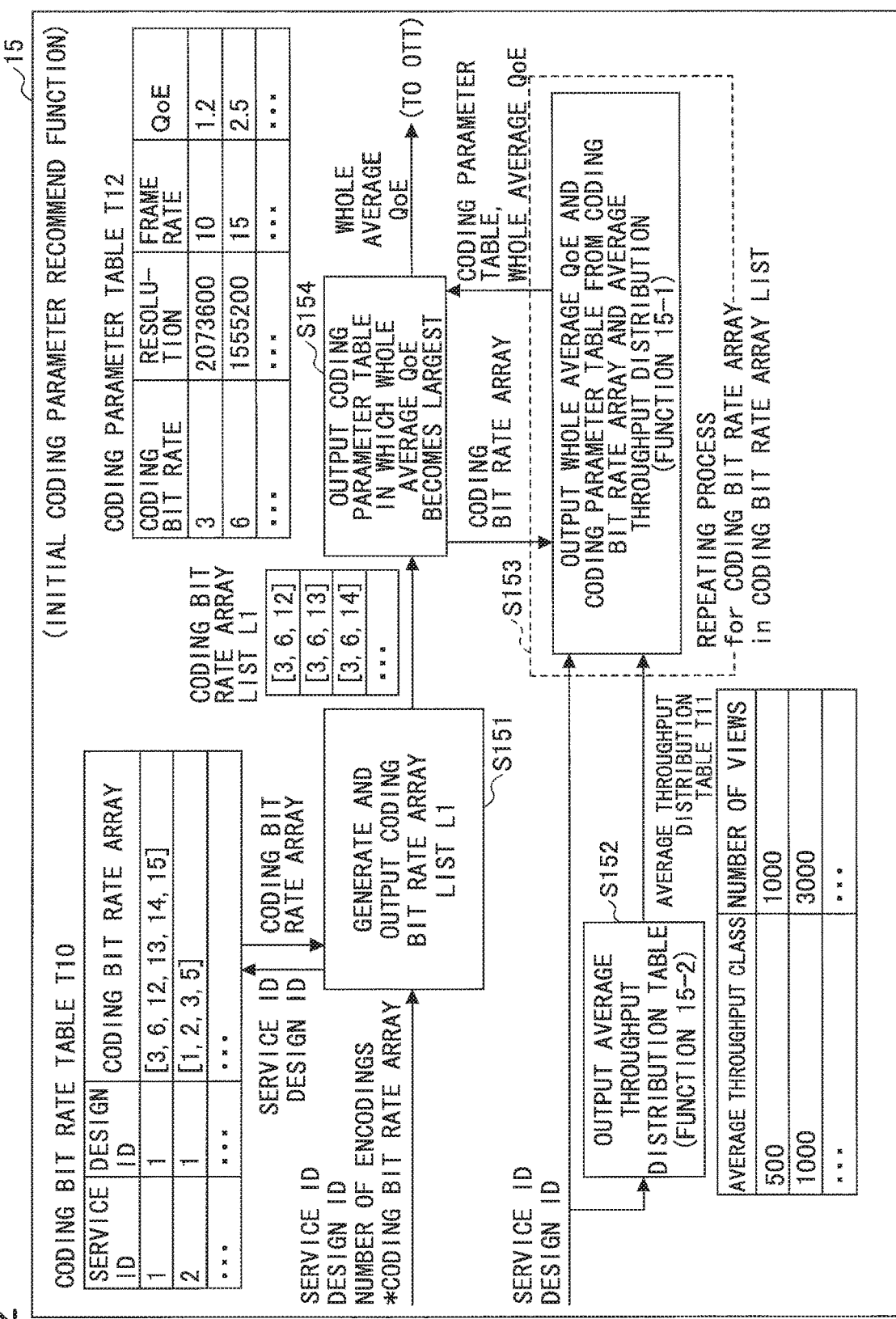
FIG. 12 is a diagram for explaining processing executed by the initial coding parameter recommend function 15 of the quality-of-experience optimization apparatus 1.

FIG. 12 is a diagram for explaining processing executed by the initial coding parameter recommend function 15 of the quality-of-experience optimization apparatus 1.

Figure 13:
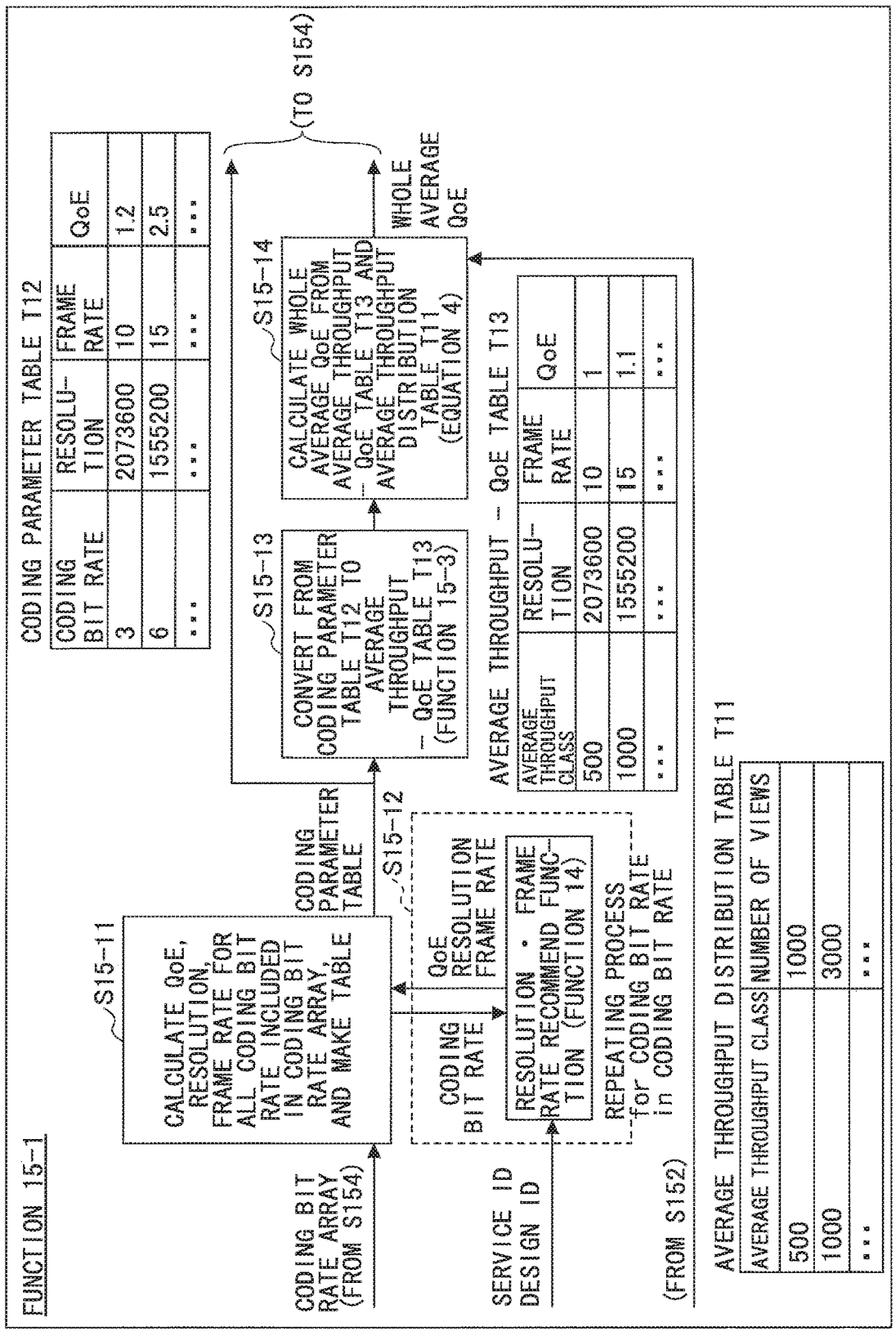
FIG. 13 is a diagram for explaining processing executed by the function 15-1, that is a function included in the initial coding parameter recommend function 15 (FIG. 12), and that outputs the whole QoE and the coding parameter table T12 from a coding bit rate array and average throughput distribution.

FIG. 13 is a diagram for explaining processing executed by the function 15-1, that is a function included in the initial coding parameter recommend function 15 (FIG. 12), and that outputs a whole QoE and a coding parameter table T12 from a coding bit rate array and average throughput distribution.

Figure 14:
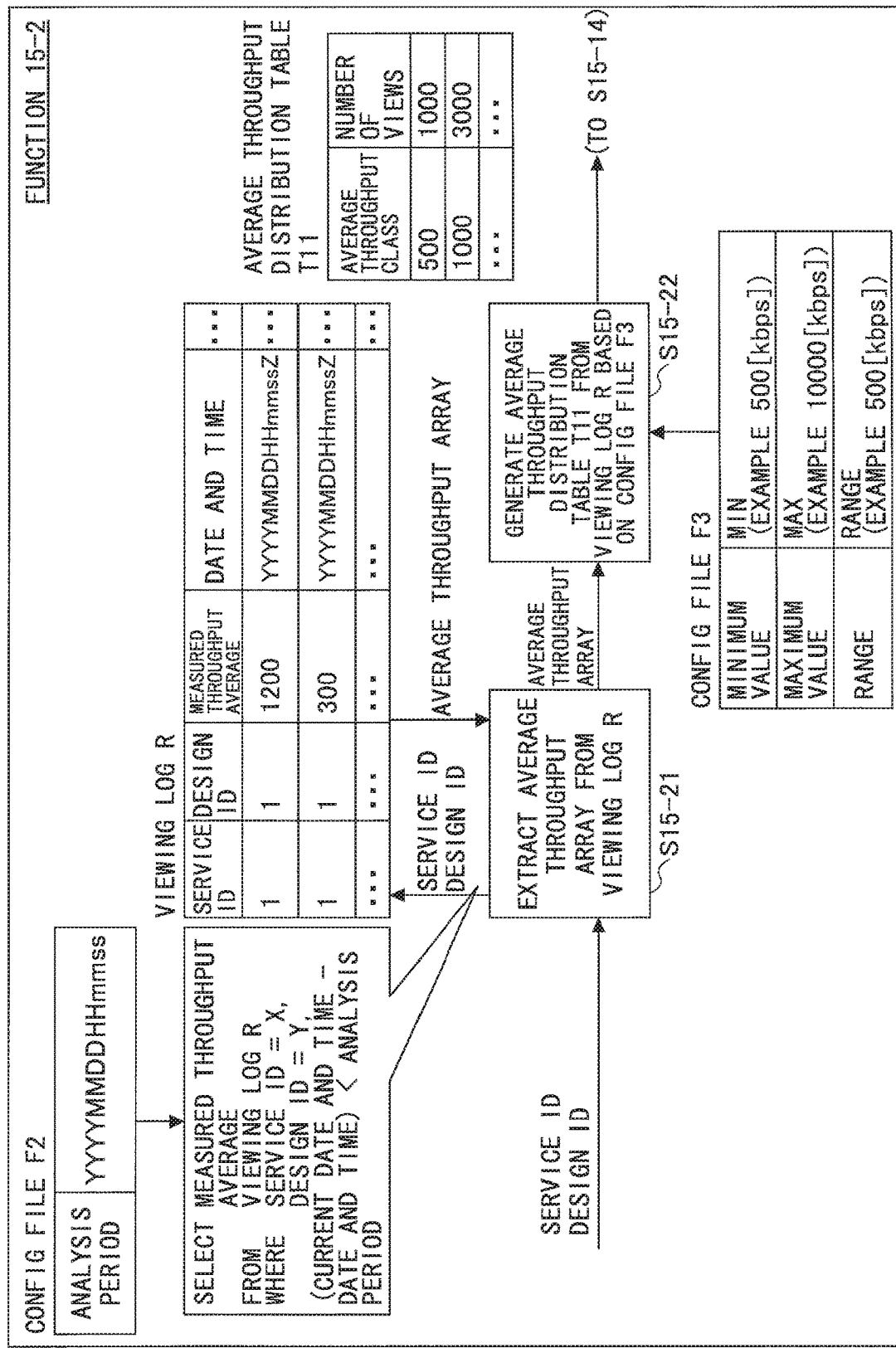
FIG. 14 is a diagram for explaining processing executed by the function 15-2, that is a function included in the initial coding parameter recommend function 15 (FIG. 12), outputting an average throughput distribution table T11.

FIG. 14 is a diagram for explaining processing executed by the function 15-2, that is a function included in the initial coding parameter recommend function 15 (FIG. 12), for outputting an average throughput distribution table T11.

Figure 15:
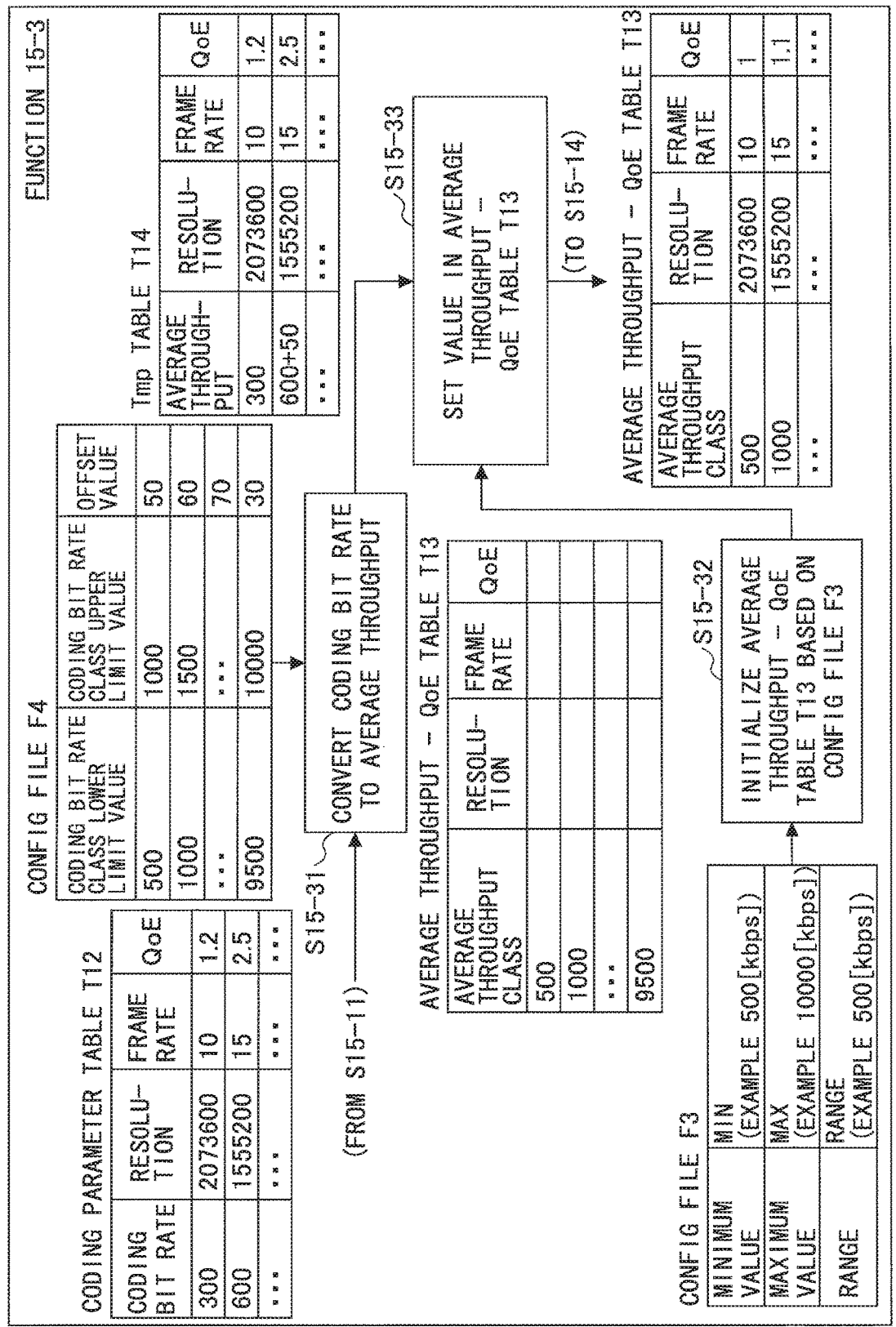
FIG. 15 is a diagram for explaining processing executed by the function 15-3, that is a function included in the function 15-1 (FIG. 13) for outputting the whole QoE and the coding parameter table T12 from the coding bit rate array and the average throughput distribution of the initial coding parameter recommend function 15, and that converts the coding parameter table T12 to the average throughput-QoE table T13.

FIG. 15 is a diagram for explaining processing executed by the function 15-3, that is a function included in the function 15-1 (FIG. 13) for outputting the whole QoE and the coding parameter table T12 from the coding bit rate array and the average throughput distribution of the initial coding parameter recommend function 15, and that converts the coding parameter table T12 to an average throughput-QoE table T13.

Each time when designing/redesigning (encoding etc.) of the content distribution service is preformed, when the initial coding parameter recommend function 15 of FIG. 12 receives various pieces of input data (service ID, design ID, number of encodings, following parameter is optional (encoding bit rate array)) via the parameter input and output unit 30 from the content distribution server of the OTT, an array of the size of the input number of encodings is created for all combinations of all coding bit rates included in the input coding bit rate array, and is output as a coding bit rate array list L1 (step S151).

When there is no coding bit rate array as the input data, a coding bit rate array corresponding to the input service ID and design ID is acquired from the coding bit rate table T10.

In addition, based on the input service ID and design ID, an average throughput distribution table T1 is acquired (step S152) by a function 15-2 (FIG. 14) which outputs the after-mentioned average throughput distribution table T11 (step S152).

Then, the input service ID and design ID, and the average throughput distribution table T11 acquired in step S152 are input, so that the whole average QoE is calculated by the after-mentioned function 15-1 (FIG. 13) for all coding bit rate arrays included in the coding bit rate array list L1 output in step S151, and a coding parameter table T12 is output (step S153, step S154). That is, the whole average QoE and the coding parameter table T12 are obtained for each coding bit rate array included in the coding bit rate array list L1.

Then, the whole average QoE and the coding parameter table T12 by which the whole average QoE becomes the largest output in step S153 are output to the OTT (step S154).

The function 15-1 for outputting the whole QoE and the coding parameter table T12 from the coding bit rate array and the average throughput distribution in FIG. 13, first, calculates a QoE, a resolution, and a frame rate in accordance with the resolution·frame rate recommend function 14 (see FIG. 11), for all coding bit rates included in the coding bit rate array input from step S154 (FIG. 12), and generates the coding parameter table T12 associating the QoE, the resolution, and the frame rate for each coding bit rate array (steps S15-11, S15-12).

Then, the after-mentioned function 15-3 (FIG. 15) converts the coding parameter table T12 to the average throughput-QoE table T13 (step S15-13), and calculates the whole average QoE according to the following equation 4 based on the converted average throughput-QoE table T13 and the average throughput distribution table T11 acquired in step S152 (FIG. 12) (step S15-14).

EQUATION 4

$$\text{WHOLE AVERAGE } MOS = \frac{1}{\text{NUMBER OF ALL USERS}} \sum_{n \in \text{AVERAGE THROUGHPUT ARRAY}} (\text{NUMBER OF } VIEWS_n - QoE_n)$$

in which n in the above equation indicates which class (n-th class) in the average throughput classes in the table T11, and the table T13.

Then, the coding parameter table T12 generated in step S15-11 and the whole average QoE calculated in step S15-14 are output to step S154 in FIG. 12.

The function 15-2 for outputting the average throughput distribution table T11 in FIG. 14 selects, from the viewing log R stored in the storage unit 24, according to the input service ID and design ID, measured throughput averages corresponding to logs of date and time which is within the analysis period set in the config file P 2 and up to the current date and time, and extracts the average throughput array (Step S15-21).

Then, the function 15-2 generates an average throughput distribution table T11 from the average throughput array extracted from the viewing log R based on the minimum value MIN, the maximum value MAX, and the width RANGE of the throughput class set in the config file F 3, and outputs it to step S15-14 of the function 15-1 (FIG. 13) (step S15-22). Note that when (MAX−MIN) % RANGE!=0 in the config file F3, the maximum MAX 2 at which (MAX 2−MIN) % RANGE!==0 && MAX 2<MAX holds true is treated as the maximum value.

The function 15-3 for converting the coding parameter table T12 to the average throughput-QoE table T13 in FIG. 15 converts all coding bit rates of the coding parameter table T12 generated in step S15-11 of the function 15-1 (FIG. 13) to average throughput to generate a Tmp table T14 (step S15-31).

In this step, when the target coding bit rate of the coding parameter table T12 is equal to or greater than the coding bit rate class lower limit value set in the config file F4 and less than the coding bit rate class upper limit value, a corresponding offset value of the config file F4 is added to the coding bit rate, and the encoding bit rate is converted into the average throughput. In other cases, the coding bit rate is directly converted to the average throughput.

In addition, the average throughput-QoE table T13 is initialized based on the minimum value MIN, the maximum value MAX, and the width RANGE of the throughput class set in the config file F3 (step S15-32). In the example of the average throughput-QoE table T13 shown in FIG. 15, 500 means from MIN to MIN+RANGE, and 1000 means from MIN+RANGE to MIN+RANGE*2.

Then, in the next process step S15-33, a resolution, a frame rate, and a QoE corresponding to each average throughput class of the initialized throughput-QoE table T13 are set.

If an average throughput equal to or less than the upper limit value of the average throughput class (1000 in the case of 500-1000) does not exist in the Tmp table T14, a resolution and a frame rate of the smallest average throughput in the Tmp table T14 are set in the average throughput-QoE table T13. Note that the method of calculating QoE in this case is described in detail later in the function 15-4 (see FIG. 16).

When the average throughput of the Tmp table T14 does not exist in the range of the average throughput class, a resolution, a frame rate, and a QoE of an average throughput that is smaller than the average throughput class and that is the maximum are set in the average throughput-QoE table T13.

When the average throughput of the Tmp table T14 exists in the range of the average throughput class, a resolution and a frame rate of the existing average throughput are set in the average throughput-QoE table T13. Here, when there are a plurality of average throughputs of the Tmp table T 14 within the range of the average throughput class, a resolution and a frame rate of the smallest average throughput are set in the average throughput-QoE table T13. The method of calculating QoE in this case is described in detail later in the after-mentioned function 15-5 (see FIGS. 17 and 18).

Figure 16B:
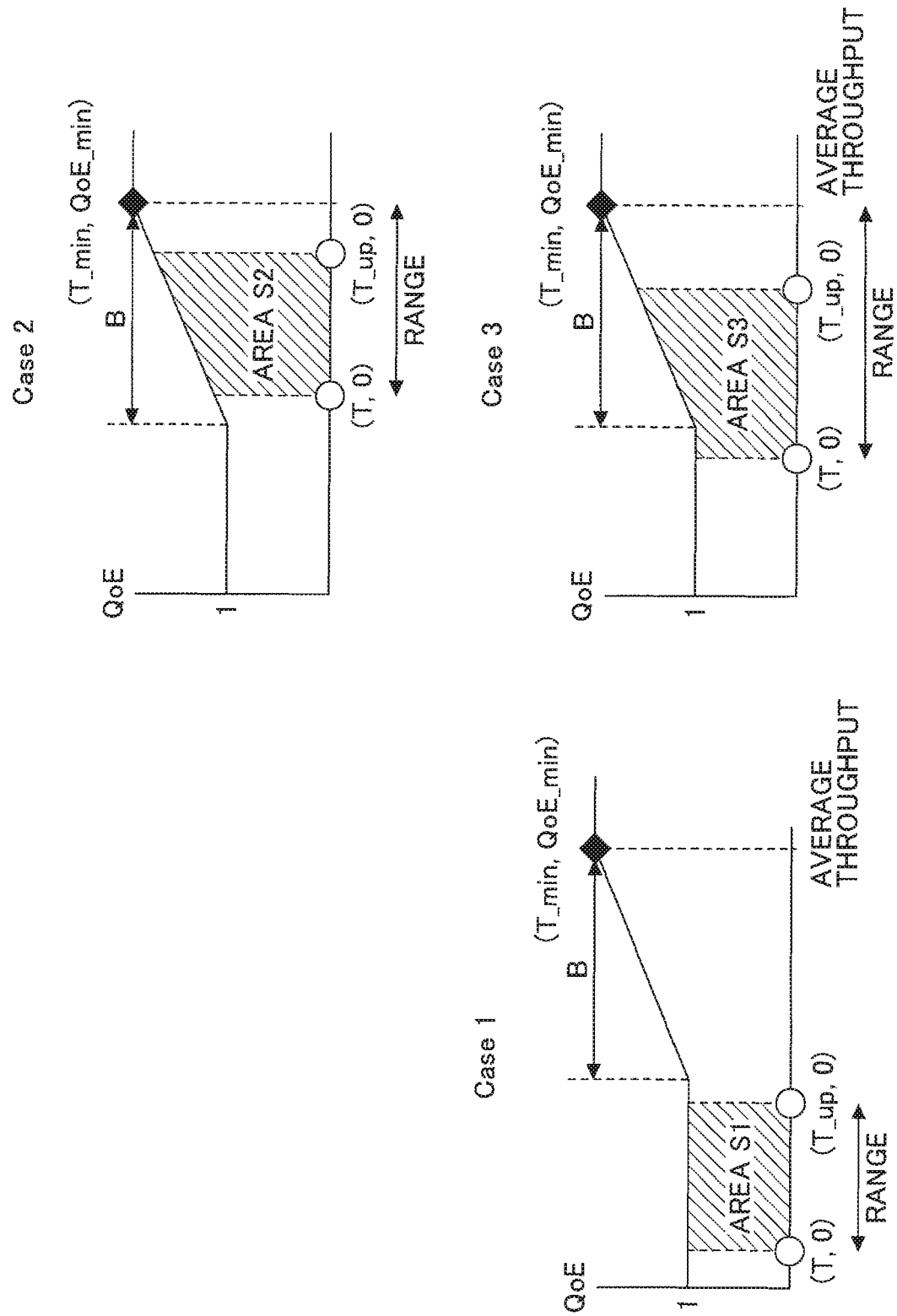
FIG. 16B is a diagram for explaining the QoE calculation function 15-4, in the conversion function 15-3 for converting the coding parameter table T12 to the average throughput-QoE table T13, when the average throughput not exceeding the upper limit value of the average throughput class does not exist in the Tmp table T 14 (T<T_min)

FIGS. 16A and 16B are diagrams for explaining the QoE calculation function 15-4, in the conversion function 15-3 for converting the coding parameter table T12 to the average throughput-QoE table T13, when the average throughput not exceeding the upper limit value of the average throughput class does not exist in the Tmp table T 14 (T<T_min).

As shown in FIG. 16A, when the upper limit value T_up of the average throughput class of the average throughput-QoE table T13 is smaller than a value obtained by subtracting a preset constant B from the minimum value T_min of the average throughputs of the Tmp table T14 (Case 1), QoE (T) at the average throughput class T of the average throughput-QoE table T13 is QoE(T)=S1/RANGE=1. This calculation is illustrated as Case 1 in FIG. 16B.

As shown in FIG. 16A, when the average throughput class T of the average throughput-QoE table T 13 is equal to or larger than the value obtained by subtracting the preset constant B from the minimum throughput T_min of the Tmp table T 13 (Case 2), QoE (T) for the average throughput class T is QoE(T)=S2/RANGE $S2=(QoE\_min-1)/B*(T\_up-(T\_min-B))^2/2-(QoE\_min-1)/B*(T-(T\_min-B))^2/2+1*(T\_up-T)$.

This calculation is illustrated as Case 2 in FIG. 16B.

As shown in FIG. 16A, in the case (Case 3) different from (Case 1), (Case 2), the QoE (T) at the average throughput class T is QoE(T)=S3/RANGE $S3=(QoE\_min-1)/B*(T\_up-(T\_min-B))^2/2+1*(T\_up-T)$.

This calculation is illustrated as Case 3 in FIG. 16B.

Figure 17B:
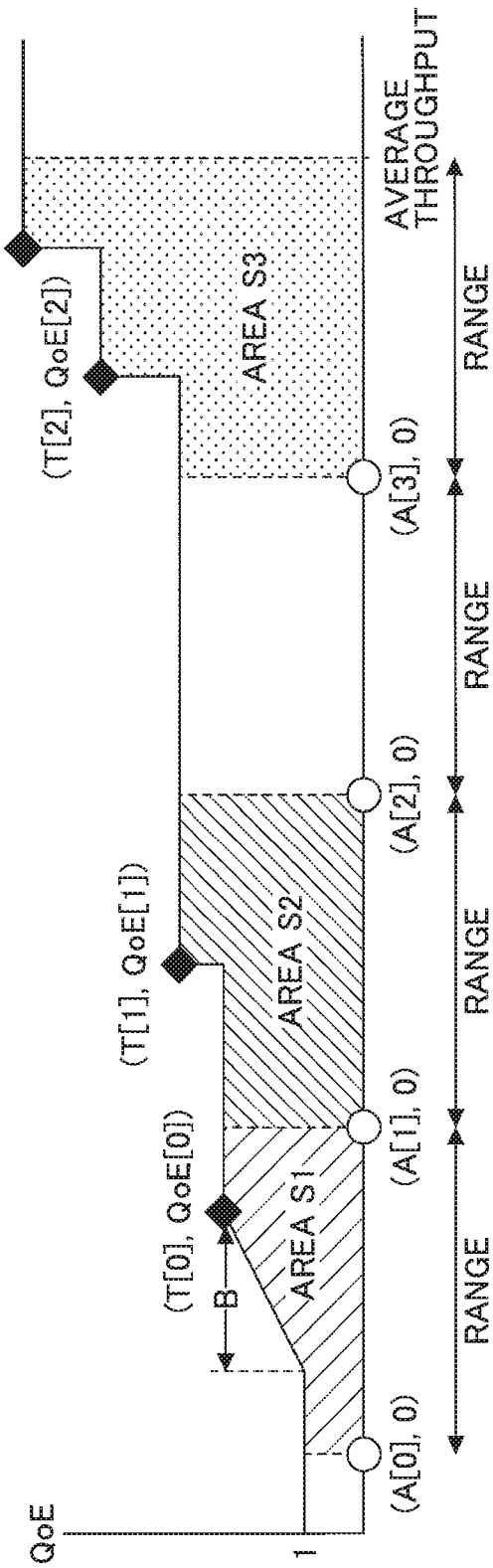
FIG. 17B is a diagram for explaining the QoE calculation function 15-5, in the conversion function 15-3 converting from the coding parameter table T12 to the average through-put-QoE table T13, when the average throughput of the Tmp table T14 exists in the range of the average throughput class.

FIGS. 17A and 17B are diagrams for explaining the QoE calculation function 15-5, in the conversion function 15-3 converting from the coding parameter table T12 to the average throughput-QoE table T13, when the average throughput of the Tmp table T14 exists in the range of the average throughput class.

As shown in FIG. 17A, when the average throughput of the Tmp table T14 equal to or less than the lower limit value of the average throughput class does not exist (A[0]<T[0]−B), the QoE of the average throughput class A[0] is, QoE=S1/RANGE $S1=(1*(T[0]-B-A[0])+((QoE[0]-1)/2+1)*B+QoE[0]*(A[1]-T[0]))$ (Step S15-51).

Regarding the above calculation, in FIG. 17B, an area S1 and RANGE are shown.

When there is an average throughput of the Tmp table T14 equal to or less than the lower limit value of the average throughput class (example 1), the QoE of the average throughput class A[1] becomes QoE=S2/RANGE $S2=(QoE[0]*(T[1]-A[1])+QoE[1]*(A[2]-T[1]))$ (Step S15-52).

Regarding the above calculation, an area S2 and RANGE are shown in FIG. 17B.

When there is an average throughput of the Tmp table T14 equal to or less than the lower limit value of the average throughput class (example 2), the QoE of the average throughput class A[3] becomes QoE=S3/RANGE $S3=(QoE[1]*(T[2]-A[3])+QoE[2]*(T[3]-T[2])+QoE[3]*(A[3]+RANGE-T[3]))$ (step S15-53).

Regarding the above calculation, an area S3 and RANGE are shown in FIG. 17B.

When there are N average throughputs in the Tmp table T14 within the range of the average throughput class, with respect to the underlined term shown in FIG. 17A, that is, in the case of QoE of average throughput class A[0] (step S15-51), the number of QoE[0]*(A[1]−T[0]) becomes N, in the case of QoE of average throughput class A[1] (step S15-52), the number of QoE[1]*(A[2]−T[1]) becomes N, in the case of QoE of average throughput class A[3] (step S15-53), the number of QoE[2]*(T[3]−T[2])+QoE[3]*(A[3]+RANGE−T[3]) becomes N.

Figure 18B:
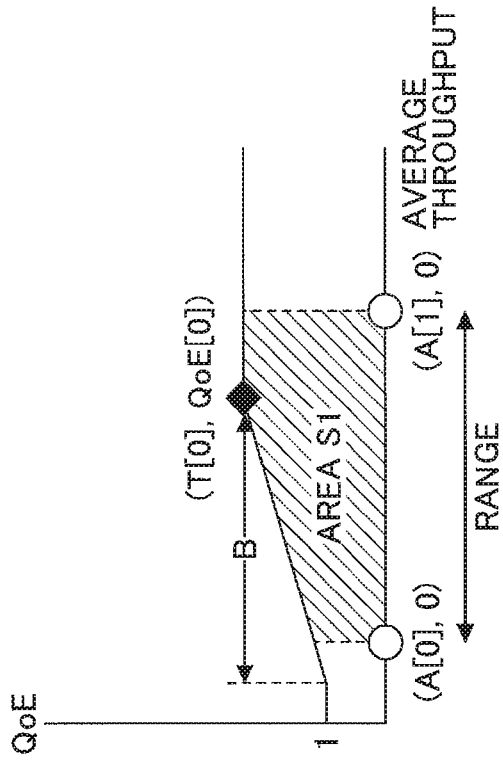
FIG. 18B is a diagram for explaining the QoE calculation function 15-5 when the average throughput of the Tmp table T14 exists in the range of the average throughput class, in the conversion function 15-3 converting the coding parameter table T 12 to the average throughput-QoE table T13.

FIGS. 18A and 18B are diagrams for explaining the QoE calculation function 15-5 when the average throughput of the Tmp table T14 exists in the range of the average throughput class, in the conversion function 15-3 converting the coding parameter table T 12 to the average throughput-QoE table T13.

As shown in FIG. 18A, when there is no average throughput of the Tmp table T14 equal to or less than the lower limit value of the average throughput class (A[0]>T[0]−B), QoE of the average throughput class A[0] becomes QoE=S1/RANGE $S1=(\text{QoE}[0]-1)*B/2-(\text{QoE}[0]-1)/B*(A[0]-(T[0]-B))^2/2+1*(T[0]-A[0])+\text{QoE}[0]*(A[1]-T[0])$ (step S15-54).

The area S1 and RANGE in the above calculation are shown in FIG. 18B.

When there are N average throughputs in the Tmp table T14 within the range of the average throughput class, with respect to the underlined term shown in FIG. 18A, that is, the number of QoE[0]*(A[1]−T[0]) becomes N.

As a result, the coding parameter table T12 and the whole average QoE obtained by which the whole average QoE obtained by the initial coding parameter recommend function 15 becomes the largest are output to the OTT.

(Real-Time Coding Parameter Recommend Function 16)

Figure 19:
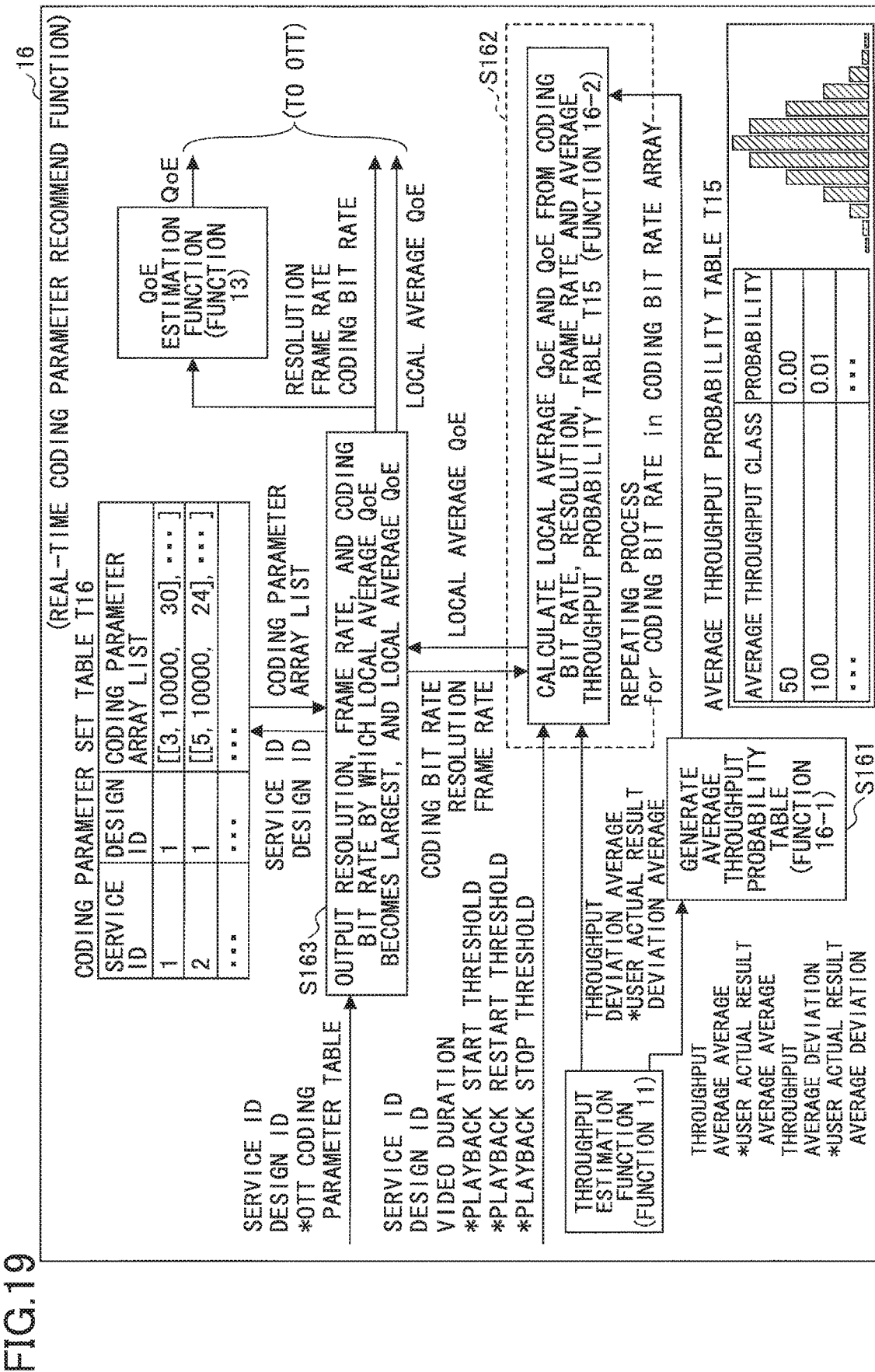
FIG. 19 is a diagram for explaining processing executed by the real-time coding parameter recommend function 16 of the quality-of-experience optimization apparatus 1.

FIG. 19 is a diagram for explaining processing executed by the real-time coding parameter recommend function 16 of the quality-of-experience optimization apparatus 1.

Figure 20:
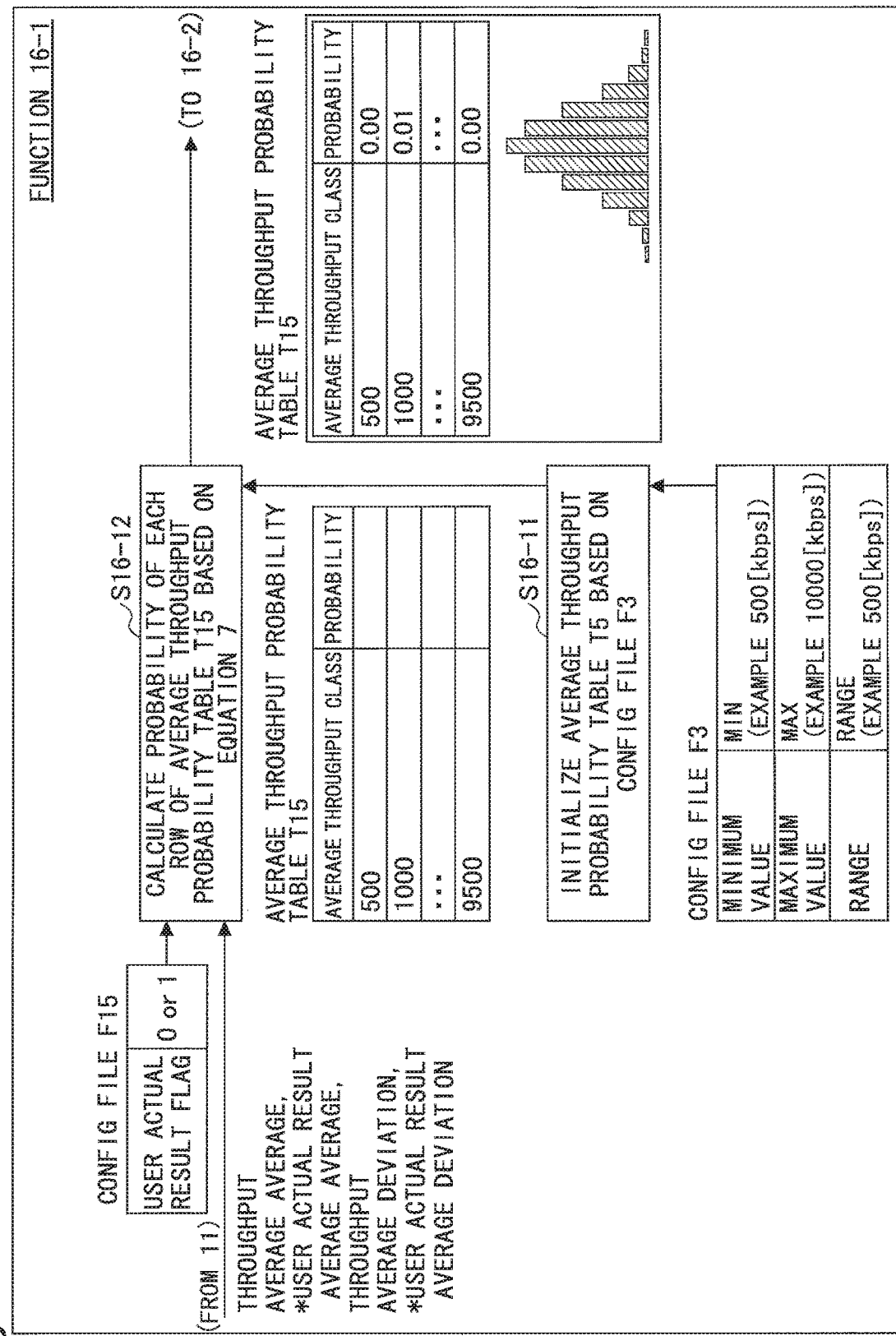
FIG. 20 is a diagram for explaining processing executed by the function 16-1 that is a function included in 16 (FIG. 19), and that generates an average throughput probability density table.

FIG. 20 is a diagram for explaining processing executed by the function 16-1 that is a function included in the real-time coding parameter recommend function 16 (FIG. 19), and that generates an average throughput probability density table.

Figure 21:
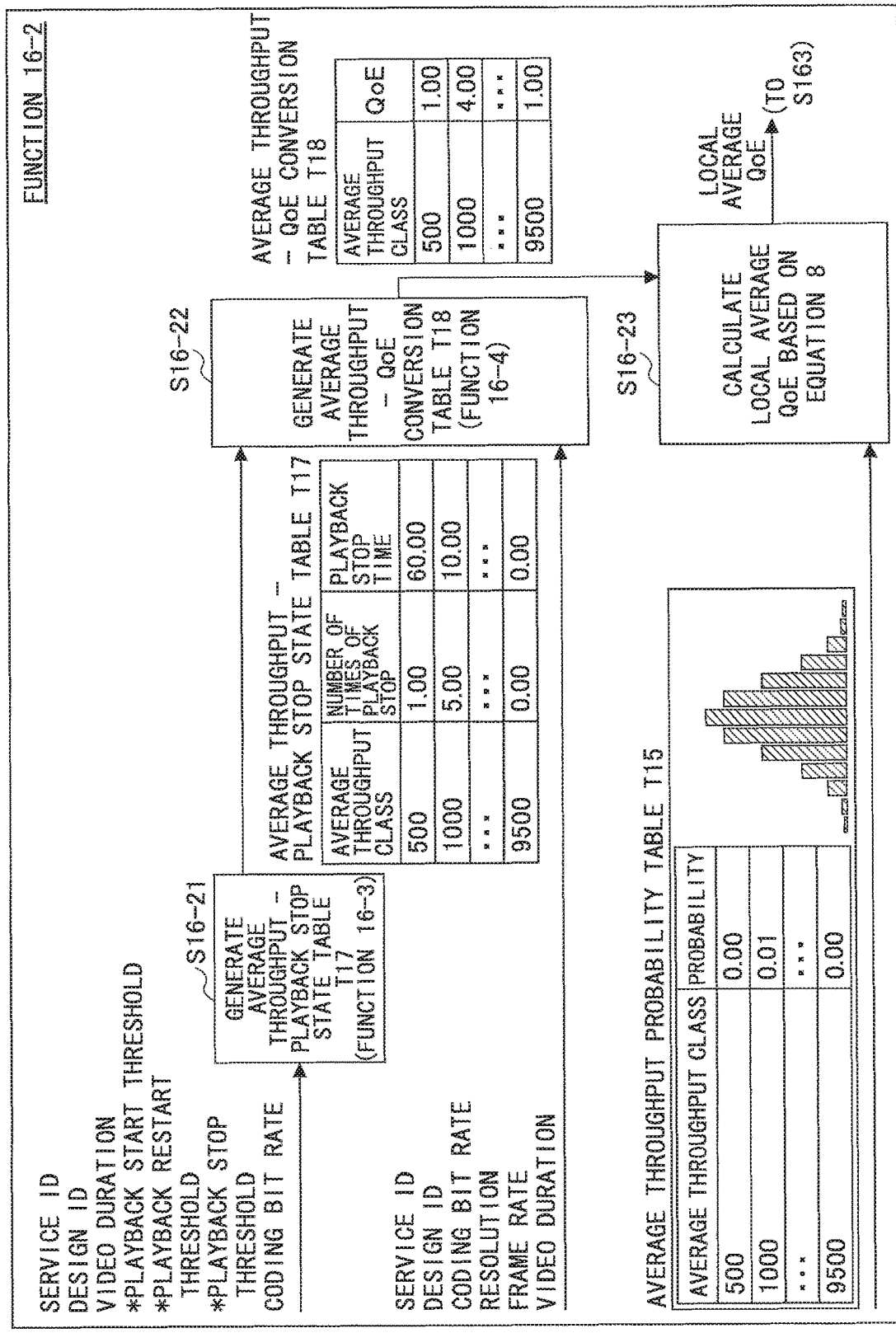
FIG. 21 is a diagram for explaining processing executed by the function 16-2 that is a function included in the real-time coding parameter recommend function 16 (FIG. 19) and that calculates local average QoE and QoE.

FIG. 21 is a diagram for explaining processing executed by the function 16-2 that is a function included in the real-time coding parameter recommend function 16 (FIG. 19) and that calculates a local average QoE and a QoE.

Figure 22:
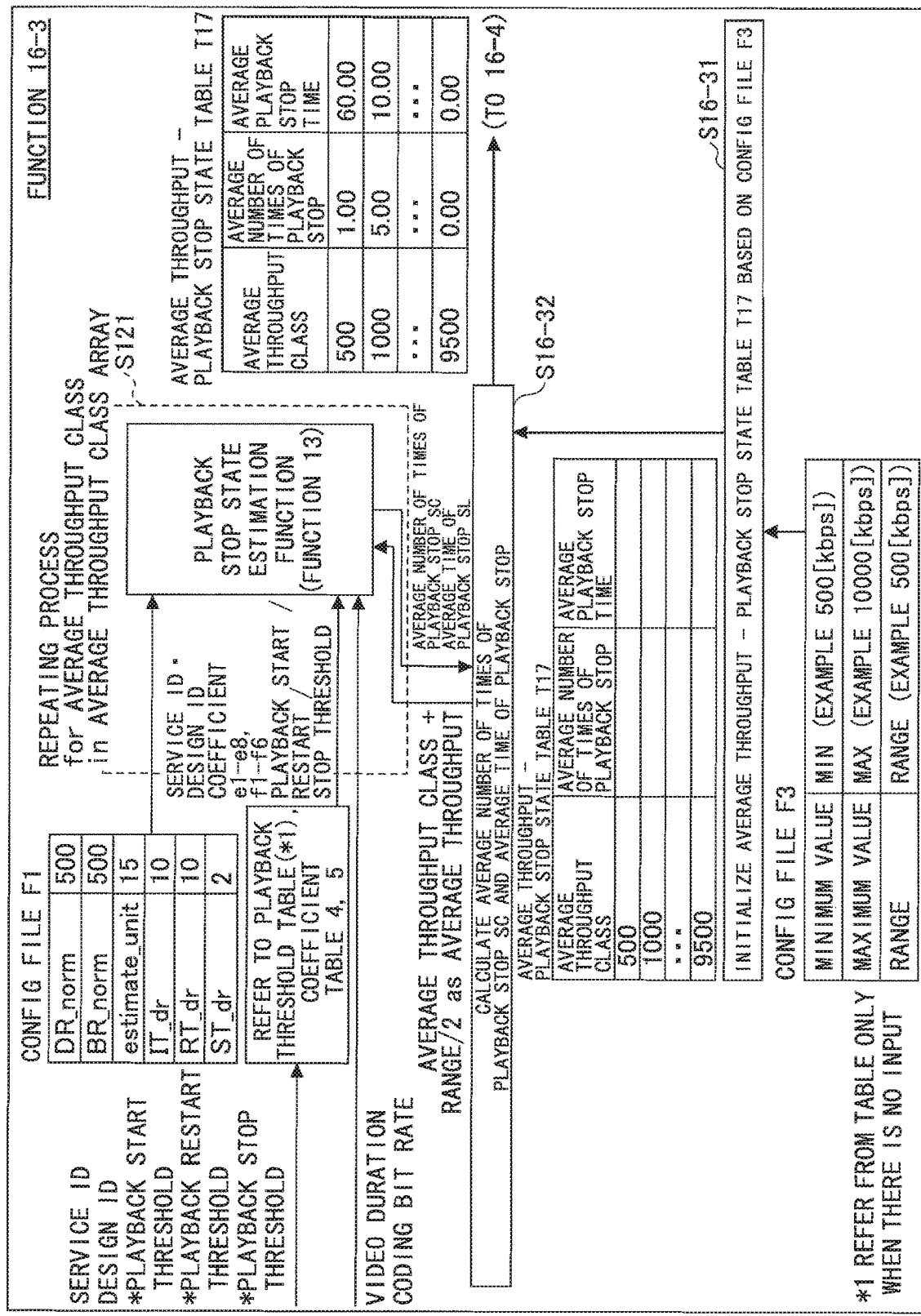
FIG. 22 is a diagram for explaining processing executed by the function 16-3 that is a function included in the function 16-2 (FIG. 21) for calculating the local average QoE and QoE of the real-time coding parameter recommend function 16, and that creates the average throughput-playback stop state table T17.

FIG. 22 is a diagram for explaining processing executed by the function 16-3 that is a function included in the function 16-2 (FIG. 21) for calculating the local average QoE and QoE of the real-time coding parameter recommend function 16, and that creates the average throughput-playback stop state table T17.

Figure 23:
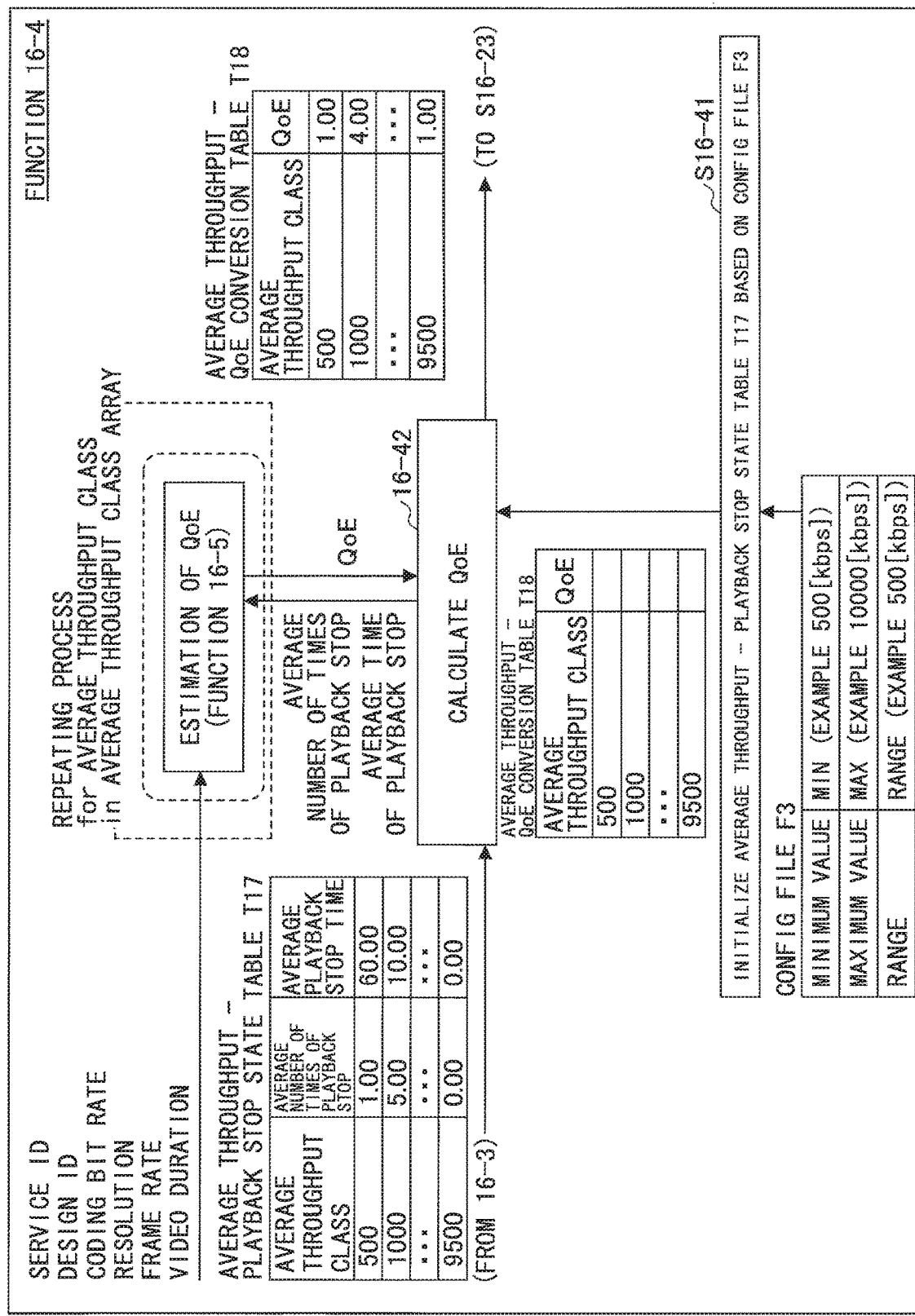
FIG. 23 is a diagram for explaining processing executed by the function 16-3 that is a function included in the function 16-2 (FIG. 21) for calculating the local average QoE and QoE of the real-time coding parameter recommend function 16, and that creates the average throughput-QoE table.

FIG. 23 is a diagram for explaining processing executed by the function 16-3 that is a function included in the function 16-2 (FIG. 21) for calculating the local average QoE and QoE of the real-time coding parameter recommend function 16, and that creates the average throughput-QoE table.

Figure 24:
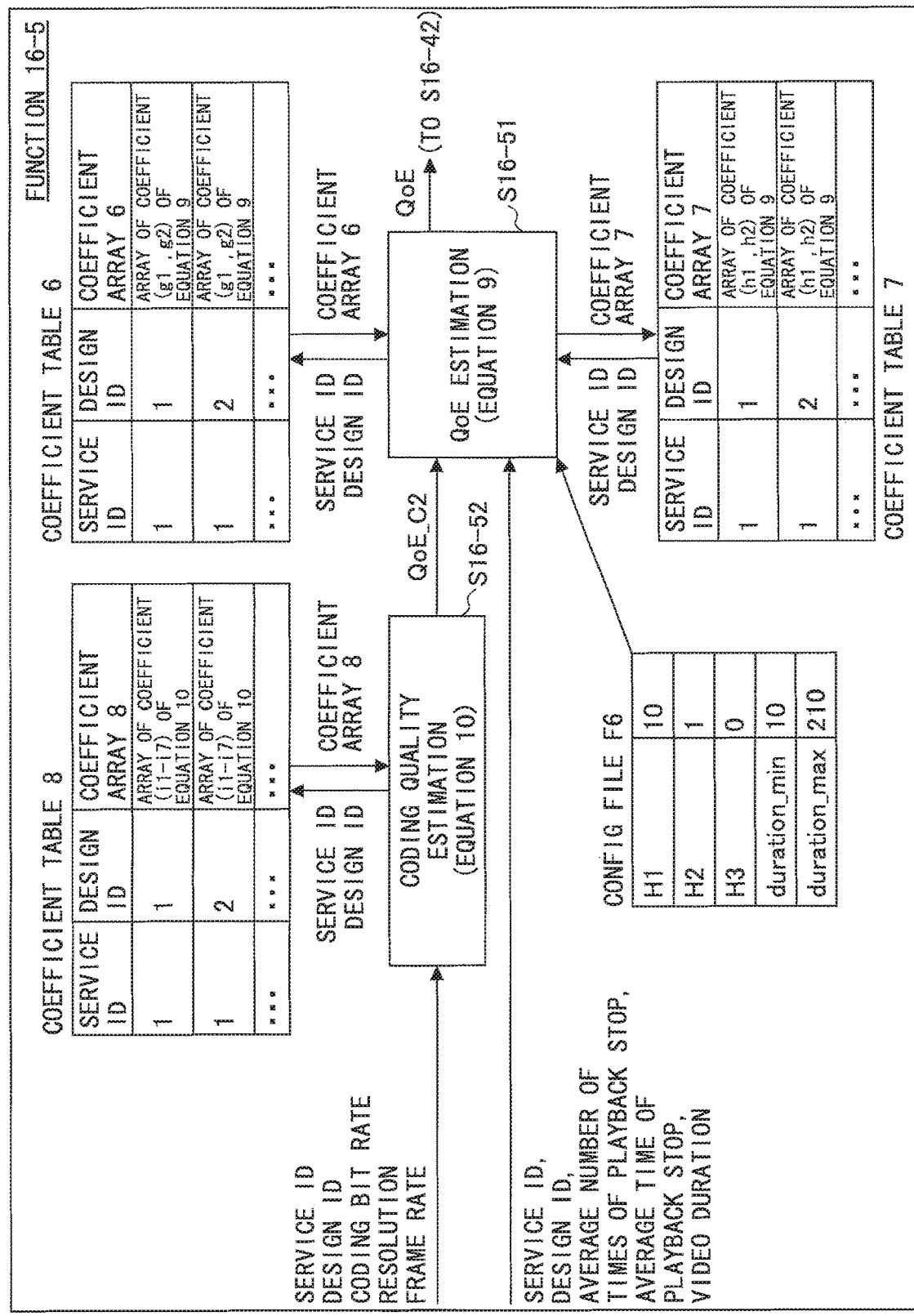
FIG. 24 is a diagram for explaining processing executed by the QoE estimation function 16-5 that is a function included in a function 16-4 (FIG. 23) for creating the average throughput-QoE table T 18 of the real-time coding parameter recommend function 16.

FIG. 24 is a diagram for explaining processing executed by the QoE estimation function 16-5 that is a function included in the function 16-4 (FIG. 23) for creating the average throughput-QoE table T 18 of the real-time coding parameter recommend function 16.

For each content distribution request of a user of a content distribution service, when the real-time coding parameter recommend function 16 of FIG. 19 receives various pieces of input data (service ID, design ID, date and time, the following are optional parameters (use server, distribution server group, user ID, fixed/mobile identifier, server speed control, [IP Address or carrier name], [cell ID or coordinate], wi-Fi use judgment, OTT coding parameter table, video duration, playback start threshold, playback restart threshold, playback stop threshold)) via the parameter input and output unit 30 from the content distribution server of the OTT, throughput average average, throughput average deviation, throughput deviation average, user actual result average average, user actual result average deviation, and user actual result deviation average estimated by the throughput estimation function 11 (see FIG. 8) are output.

Then, based on the throughput average average, the user actual result average average, the throughput average deviation, and the user actual result average deviation output from the throughput estimation function 11, the creation function 16-1 (FIG. 20) of the average throughput probability table, which will be described later, creates the average throughput probability table T15 and outputs it to the after-described function 16-2 (FIG. 21) for calculating the local average QoE and QoE (Step S161).

Further, when the calculation function 16-2 of the local average QoE and QoE receives the throughput deviation average, the user actual deviation average output from the throughput estimation function 11, the input service ID, the setting ID, the video duration, the playback start threshold, the playback restart threshold, the playback stop threshold, and the average throughput probability table T15 output from the function 16-1 (FIG. 20) for creating the average throughput probability table, the calculation function 16-2 calculates the local average QoE for all combinations of coding bit rate, resolution, and frame rate in the input OTT coding parameter table (step S162).

When the OTT coding parameter table is not input, the coding parameter array list is acquired from the coding parameter set table T16, and the set of the coding bit rate, resolution and frame rate is input to the calculation function 16-2 of the local average QoE and the QoE (Step S163).

Then, the resolution, the frame rate, the coding bit rate, and the local average QoE by which the local average QoE calculated by the calculation function 16-2 of the local average QoE and the QoE becomes the largest are output to the OTT. Also, the resolution, the frame rate, and the coding bit rate are input to the QoE estimation function 13 (FIG. 10) (step S163).

The function 16-1 for generating an average throughput probability density table in FIG. 20 initializes the average throughput probability table T15 based on the minimum value MIN, the maximum value MAX, and the width RANGE of the throughput class set in the config file F3 (step S16-11). The average throughput class in the average throughput probability table T15 is a value that increases from the minimum value MIN by the width RANGE.

Then, the user actual result flag set in the config file F5, and the throughput average average, user actual result average average, throughput average deviation, user actual result average deviation estimated by the throughput estimation function 11 (see FIG. 8) are input, and the probability of each row of the average throughput probability table T 15 is calculated based on the following equation 7 so as to output the average throughput probability table T15 to the calculation function 16-2 (FIG. 21) of the local average QoE and QoE (step S16-12).

EQUATION 7

WHEN $s \neq 0$ $$s'\sqrt{\log_e\left\{1+\left(\frac{s}{m}\right)^2\right\}} \quad (7\text{-}1)$$

$$m' = \log_e(m) - \frac{s'^2}{m} \quad (7\text{-}2)$$

$$P = \quad (7\text{-}3)$$

$$\begin{cases} 0 & \text{if } T_{median}=0 \\ \left(\frac{1}{\sqrt{2\pi}\cdot s'}e^{-\frac{(\log_e(T_{median})-m')^2}{2s'^2}}\right)\cdot\frac{1}{T_{median}}\cdot\text{RANGE} & \text{else} \end{cases}$$

-continued

WHEN $s = 0$ $$P = \begin{cases} 1 & \text{if } T_{median} - \frac{RANGE}{2} \leq m < T_{median} + \frac{RANGE}{2} \\ 0 & \text{else} \end{cases} \quad (7\text{-}4)$$

In the equation 7, P is a probability, m is a throughput average average or a user actual result average average. S is a throughput average deviation variance or a user actual result average deviation. T_median is an average value (=average throughput class+RANGE/2) of the upper limit value and the lower limit value of the average throughput class, and RANGE is a value obtained from the config file F3.

In the equation 7, when the user actual result flag is off "0", the throughput average average is set to m. When the user actual result flag is on "1", the user actual average average is m, but when the user actual average average is not input, the throughput average average is m.

Further, in the equation 7, when the user actual result flag is off "0", the throughput average deviation is set as s. When the user actual result flag is on "1", the user actual average deviation is set as s, but if the user actual result average deviation is not input, the throughput average deviation is set as s.

Note that, If m=0 or m<the smallest value, it is treated as an error.

In the function 16-2 for calculating the local average QoE and QoE in FIG. 21, based on the input service ID, design ID, video duration, playback start threshold, playback restart threshold, playback stop threshold, and coding bit rate, the after-mentioned function 16-3 (FIG. 22) for creating an average throughput-playback stop state table T17 creates an average throughput-playback stop state table T17 (step S16-21).

Then, the input service ID, the design ID, the coding bit rate, the resolution, the frame rate, the video duration, and the average throughput-playback stop state table T17 created by the function 16-3 (FIG. 22) are input, so that an average throughput-QoE conversion table T18 is created (step S16-22) by the after-mentioned function 16-4 (FIG. 23) for creating the average throughput-QoE table.

Then, the average throughput probability table T15 created by the average throughput probability density table generation function 16-1 (FIG. 20), and the average throughput-QoE conversion table T18 created by the average throughput-QoE table creation function 16-4 are input, so that the local average QoE is calculated based on the following equation 8, and it is output to the process of step S163 in FIG. 19 (step S16-23).

EQUATION 8

$$LAQoE = \sum_{n \in MTC[]} (PD_n \cdot QoE_n)$$

In the equation 8 above, LAQoE is the local average QoE, PDn is the probability of the average throughput class n in the average throughput probability table T15. QoEn is the QoE of the average throughput class n in the average throughput-QoE conversion table T18. MTC[ ] is the average throughput class sequence of the average throughput-probability table.

In the function 16-3 for creating the average throughput-playback stop state table T17 in FIG. 22, based on the minimum value MIN, the maximum value MAX, and the width RANGE of the throughput class set in the config file F3, the average throughput—the playback stop state table T17 is initialized (step S16-31).

Then, for each row of the average throughput—the playback stop state table T17, a value (average throughput class+RANGE/2) obtained by adding one half of RANGE to the corresponding average throughput class is set as an average throughput, and the average number of times of playback stop SC and the average playback stop time SL are calculated by the playback stop state estimation function 12 (see step S121 of FIG. 9) (step S16-32). The average throughput-playback stop state table T17 thus created is output to the average throughput-QoE table creation function 16-4 (FIG. 23).

The function 16-4 for creating the average throughput-QoE table in FIG. 23 initializes the average throughput-QoE conversion table T18 based on the minimum value MIN, the maximum value MAX, and the width RANGE of the throughput class set in the config file F3 (steps S16-41).

Then, the average number of times of playback stop and the average playback stop time in all average throughput classes in the average throughput-playback stop state table T17 created by the creation function 16-2 of the average throughput-playback stop state table (see FIG. 22) are sequentially input, so that each corresponding QoE is calculated by the after-mentioned QoE estimation function 16-5, and the QoE is assigned as a QoE of the corresponding average throughput class in the average throughput-QoE conversion table T18 (step S16-42). The average throughput-QoE conversion table T18 thus created is output to step S16-23 of the local average QoE and QoE calculation function 16-2 (FIG. 21).

The QoE estimation function 16-5 in FIG. 24 receives the input service ID, design ID, average number of time of playback stop SC, average playback stop time SL, video duration duration, constants H1, H2, H3, duration_min, duration_max set by the config file F6, coefficient array 6 (g1, g2) and coefficient array 7 (h1, h2) acquired from the coefficient tables 6, and 7 corresponding to the service ID and the design ID, and calculates QoE on the basis of the following equation 9 (step S16-51).

EQUATION 9

$$QoE = (QoE\_C_2 - 1) \cdot (I - \text{Min}(DR, 1) + 1) \quad (9\text{-}1)$$

$$DR = g_1 \cdot \log(SL_1 + 1) \cdot \frac{1 - g_2^{SC}}{1 - g_2} \cdot slope \quad (9\text{-}2)$$

$$slope = \frac{h_1}{duration' + H_1} + h_2 \quad (9\text{-}3)$$

$$duration' = \begin{cases} duration_{min} & \text{if } duration < duration_{min} \\ duration_{max} & \text{elseif } duration > duration_{max} \\ duration & \text{else} \end{cases} \quad (9\text{-}4)$$

$$SL_1 = \begin{cases} SL & \text{if } SC < H_2 \\ \frac{SL}{SC + H_3} & \text{else} \end{cases} \quad (9\text{-}5)$$

Min(A, B) in the above equation is a function that returns a smaller value among A and B. SC is an average number of times of playback stop, and SL is an average playback stop time, and $g_1$, $g_2$, $h_1$, $h_2$ are constants, duration is a video duration, and duration_min, duration_max, $H_1$~$H_3$ are constants defined in the config file.

Note that the intermediate parameter QoE_C 2 used in the equation 9 is calculated based on the equation 10 below which receives the input service ID, design ID, coding bit rate Bitrate, resolution RS, frame rate FR, and the coefficient array 8 (i1~i7) acquired from the coefficient table 8 corresponding to the service ID and the design ID (step S16-52).

EQUATION 10

$$QoE\_C_2 = I_1 + \frac{1 - I_1}{1 + \left(\frac{bitrate}{I_2}\right)^{i_1}} \quad (10\text{-}1)$$

$$I_1 = \frac{4 \cdot (1 - \exp(-i_3 \cdot FR)) \cdot RS}{i_2 + RS} + 1 \quad (10\text{-}2)$$

$$I_2 = \frac{i_4 \cdot RS + i_6 \cdot \log(i_7 \cdot FR + 1)}{1 - e^{-i_5 \cdot RS}} \quad (10\text{-}3)$$

In the above equation, Bitrate is a coding bit rate, RS is a resolution, FR is a frame rate, $i_1$~$i_7$ are constants.

The equation 9 and the equation 10 are also model equations obtained by experiments and the like as described before. In the equation 10, QoE (QoE_C 2) is calculated by inputting a coding bit rate, a resolution, and a frame rate, and in the equation 9, a QoE is calculated further taking into account the number of times of playback stop and the playback stop time.

As a result, the resolution, the frame rate, and the coding bit rate, by which the local average QoE obtained by the real-time coding parameter recommend function 16 becomes the largest, and the local average QoE are output to the OTT.

(Throughput Table Information Update Function 21)

Figure 25:
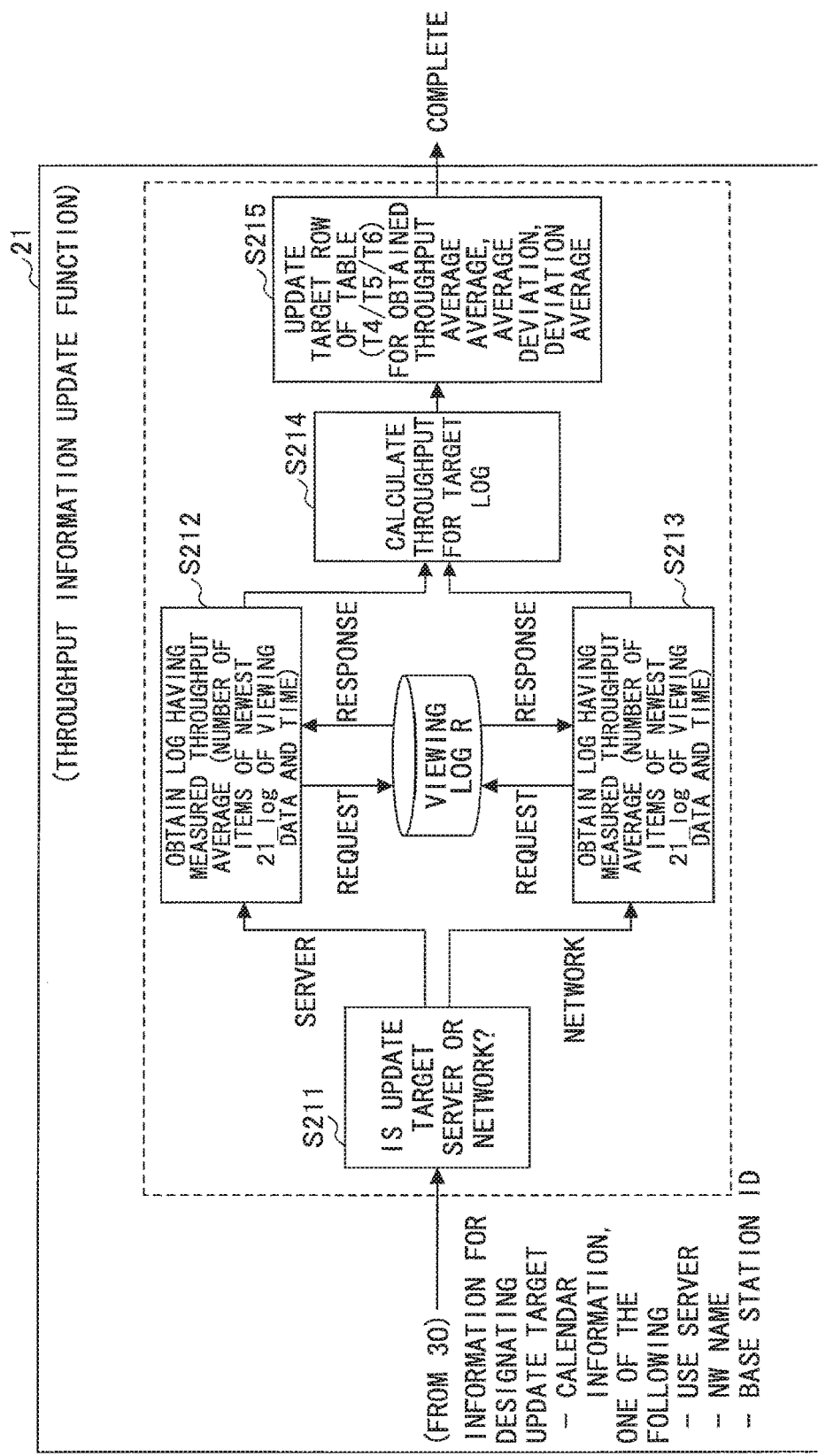
FIG. 25 is a diagram for explaining processing executed by the throughput table information update function 21 of the quality-of-experience optimization apparatus 1.

FIG. 25 is a diagram for explaining processing executed by the throughput table information update function 21 of the quality-of-experience optimization apparatus 1.

For example, based on automatic start of about once every 1 to 5 minutes, when update target designation information (any one of calendar information, use server, NW name, and base station ID) is input from among various pieces of input data input from the content distribution server of the OTT via the parameter input and output unit 30, whether the input data of update target is the use server, NW name or base station ID is determined (step S211).

When it is determined that the input data of update target is the calendar information and the use server, according to the calendar information and the utilization server, the logs of the (calendar information, use server)-speed conversion table T6 including the measured throughput average are updated using the latest logs of the number of (21_log) acquired from the viewing log R stored in the storage unit 24 (Step S212).

When it is determined that the input data of update target is the calendar information and the NW name or is the calendar information and the base station ID, according to the calendar information and the NW name (or base station ID), the logs of the (calendar information, NW name)-speed conversion table T5 (or (calendar information, base station ID)-speed conversion table T4) including the measured throughput average are updated using the latest logs of the number of (21_log) acquired from the viewing log R stored in the storage unit 24 (Step S213).

Then, throughput calculation (throughput average average=average of measured throughput average, throughput average deviation=deviation of measured throughput average, throughput deviation average=average of measured throughput deviation) is performed on the target logs acquired in step S212 or S213 (step S214).

Then, with respect to the throughput average average, the throughput average deviation, and the throughput deviation average calculated in step S214, the target rows of the corresponding speed conversion table T4/T5/T6 are updated (step S215).

For each call by the automatic activation, for each of the above (calendar information, base station ID)-speed conversion table T4, (calendar information, NW name)-speed conversion table T5, and (calendar information, use server)-speed conversion table T6, the throughput table information update function 21 is executed for a combination in which logs, containing the information of the measured throughput average, the number of which is equal to or greater than the number (21_threshold) which is a calculation condition from the previous update, are accumulated in the viewing log R.

Note that, based on the time when the system is in operation, the current calendar information, and a part corresponding to calendar information one hour after are calculated.

As a result, the (calendar information, base station ID)-speed conversion table T4, the (calendar information, NW name)-speed conversion table T5, the (calendar information, use server)-speed conversion table T6 are always updated to the latest state, so that calculation of each function in the estimation value•recommend value calculation unit 10 can be executed.

(Viewing Log Update Function 22)

Figure 26A:
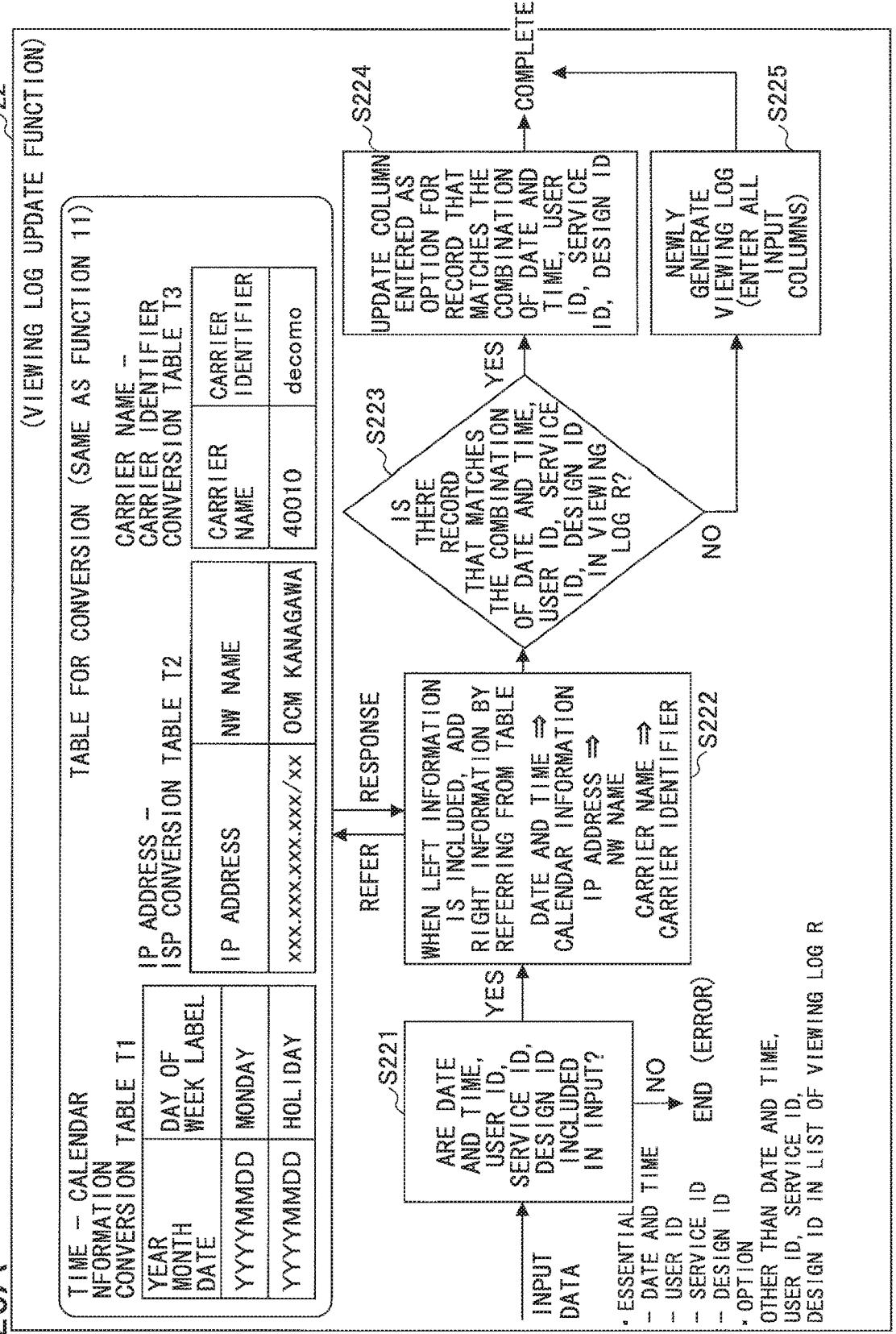
FIG. 26A is a diagram for explaining processing executed by the viewing log update function 22 of the quality-of-experience optimization apparatus 1.

FIGS. 26A and 26B are diagrams for explaining processing executed by the viewing log update function 22 of the quality-of-experience optimization apparatus 1. FIG. 26A shows a procedure of the process and FIG. 26B shows the viewing log.

It is determined whether or not (date and time, user ID, service ID, design ID) are included as input data from the OTT (step S221).

In the case where it is determined that (date and time, user ID, service ID, design ID) are included as the input data, when the date and time is included, the (day of week, time)-calendar information table T1 is referred to, and calendar information corresponding to the date and time is added, when an IP address is included, the IP address-IP conversion table T2 is referred to, and the carrier name corresponding to the IP address is added, when a carrier name is included, the carrier name-carrier identifier conversion table T3 is referred to, and a carrier identifier corresponding to the carrier name is added (step S222).

Then, it is determined whether or not a record having the same combination of the input (date and time, user ID, service ID, design ID) exists in the viewing log R (step S223).

Then, when the record having the same combination of the input (date and time, user ID, service ID, design ID) exists in the viewing log R, content of a column input as an option of the combination is updated for the record having the combination of the input (date and time, user ID, service ID, design ID) (step S224).

When the record having the combination of the input (date and time, user ID, service ID, design ID) does not exist in the viewing log R, all input columns are entered to newly create a record of the viewing log R (step S225).

As a result, it is possible to always update the record of the viewing log R to the latest state and to perform calculation of each function in the estimation value•recommend value calculation unit 10.

Therefore, according to the quality-of-experience optimization system having the above configuration, a recommend request and various distribution parameters for optimizing the QoE of the content distribution service are input from the recommend request apparatus 40 of the OTT to the quality-of-experience optimization apparatus 1 via the parameter input and output unit 30. Then, the throughput estimation function 11 estimates a throughput average average, throughput average deviation and the like on the basis of the input distribution parameter (including coding bit rate, resolution, frame rate) and various setting values (including coefficient arrays) stored in the storage unit 24 according to the distribution parameter and input data from the system administrator. Then, the real-time coding parameter recommend function 16 calculates coding parameters (including resolution and frame rate corresponding to each coding bit rate) by which the local average QoE becomes the largest, and outputs the coding parameters as recommendation values to the content distribution system OTT via the parameter input output unit 30.

Also, according to the quality-of-experience optimization system having the above configuration, the QoE estimation function 13 estimates a QoE on the basis of the input distribution parameter (including coding bit rate, resolution, frame rate) and various setting values (including coefficient arrays) stored in the storage unit 24 according to the distribution parameter and input data from the system administrator. Then, the resolution•frame rate recommend function 14 calculates a resolution and a frame rate by which estimated QoE becomes the largest, the initial coding parameter recommend function 15 calculates coding parameters (including a resolution and a frame rate for each coding bit rate) by which an average QoE of the whole of content distribution target users becomes the largest, so that these parameters are output to the content distribution system OTT via the parameter input and output unit 30.

Accordingly, in the OTT, a distribution parameter such as a distribution rate and the like of the content distribution service can be set according to the coding parameter, obtained as the recommend value, by which the local average QoE or the average QoE of the whole of the content distribution target users becomes the largest. Therefore, it becomes possible to select a content distribution method that maximizes QoE of the user, and quality improvement effect can be expected such as not causing rebuffering with fixed distribution rate.

Also, according to the quality-of-experience optimization system having the above configuration, various setting values (including various tables Tn, various coefficients (constants)) stored in the storage unit 24 are updated by the setting value update unit 20 based on distribution parameters newly input via the parameter input and output unit 30 and input data from a system administrator. Thus, it is possible to estimate the QoE, to calculate a resolution and a frame rate by which the QoE becomes the largest, and to calculate coding parameters by which the whole average QoE becomes the largest, by always updating the setting values to new state.

By the technique described in the present embodiment, the problems presented in (1) to (3) of the "problem to be solved by the invention" can be solved. Specifically, it becomes possible to select a content distribution method that maximizes QoE of the user, and quality improvement effect can be expected such as not causing rebuffering with fixed distribution rate.

Each of methods of processing by the quality-of-experience optimization system described in each of the above embodiments can be stored in a medium of an external recording device, such as a memory card (ROM card, RAM card, etc.), a magnetic disk (floppy (registered trademark) disk, hard disk etc.), an optical disk (CD-ROM, DVD etc.), and a semiconductor memory, and can be distributed, as a program that can be executed by a computer, in which the methods of processing include each method of the recommend request processing accompanied by output of the distribution parameter from the OTT by the recommend request apparatus 40 of FIG. 1, the reception processing of the estimation value/recommend value from the quality-of-experience optimization apparatus 1, the processing of the throughput estimation function 11 shown in FIG. 8, the processing of the playback stop state estimation function 12 shown in FIG. 9, the processing of the QoE estimation function 13 shown in FIG. 10, the processing of the resolution-frame rate recommend function 14 shown in FIG. 11, the processing of the initial coding parameter recommend function 15 shown in FIGS. 12~18, the processing of the real-time coding parameter recommend function 16 shown in FIGS. 19~24, the processing of the throughput table information update function 21 shown in FIG. 25, and the processing of the viewing log update function 22 shown in FIG. 26.

Then, a computer (control device: CPU) of an electronic device reads the program stored in the medium of the external storage device into a storage device, and operation is controlled by the read program, so that the recommend request function, the estimation value•recommend value calculation function, and the setting value update function described in each embodiment are realized, and processing the same as that of the before-mentioned methods can be realized.

Data of the program for realizing each of the methods can be transmitted on a NW as a form of program code. An electronic device downloads the data of the program from a computer device connected to this NW to store the data of the program in a storage device, so that the before-mentioned recommend request function, the estimation value•recommend value calculation function, and the setting value update function can be also realized.

The present invention is not limited to the above embodiments, and various modifications can be made in carrying-out stages without departing from the gist thereof. Further, each embodiment includes inventions at various stages, and various inventions can be extracted by appropriately combining a plurality of disclosed constituent components. For example, in the case where the problem described in the section of "problem to be solved by the invention" can be solved and the effect described in the section of the effect of the invention can be obtained even if some constituent components are deleted from all of the constituent components shown in each embodiment, or even if some constituent components are combined in a different form, a configuration in which these constituent components are deleted or combined can be extracted as an invention.

The present patent application claims priority based on Japanese patent application No. 2015-020500, filed in the JPO on Feb. 4, 2015, and the entire contents of the Japanese patent application No. 2015-020500 are incorporated herein by reference.

DESCRIPTION OF REFERENCE SIGNS 1 quality-of-experience optimization apparatus
10 estimation/recommend function (estimation value•recommend value calculation unit)
11 throughput estimation function
12 playback stop state estimation function
13 QoE estimation function
14 resolution•frame rate recommend function
15 initial coding parameter recommend function
16 real-time coding parameter recommend function
20 data accumulation function (setting value update unit)
21 throughput table information update function
22 viewing log update function
23 setting value reference function
24 storage unit
25 input and output apparatus
30 parameter input and output unit
40 recommend request apparatus
41 distribution parameter output unit
42 recommend value reception unit
OTT content distribution system

The invention claimed is:

1. A quality-of-experience optimization system configured to optimize quality (QoE: Quality of Experience) that a user experiences in a content distribution service, comprising:
circuitry configured to
output a distribution parameter candidate of content distribution for optimizing QoE of content distribution, and receive a distribution parameter for optimizing the QoE as a recommend value;
estimate QoE from the received distribution parameter candidate, and calculate a distribution parameter for optimizing the QoE as a recommend value to output the recommend value, the distribution parameter being calculated through a throughput estimation function that estimates a throughput from input data including a time at which the user accesses the content distribution service and information of a network that the user uses, a playback stop state estimation function, a QoE estimation function that estimates the QoE for all pairs of resolutions and frame rates of the content distribution based on a model equation that includes at least inputs of a respective resolution, frame rate, and coding bit rate for each QoE estimate, a resolution•frame rate recommend function that outputs one of the resolutions and one of the frame rates for which the QoE estimated by the QoE estimation function is largest, an initial coding parameter recommend function, and a real-time coding parameter recommend function; and
optimize the QoE in accordance with the recommend value,
wherein the initial coding parameter recommend function generates a coding bit rate array list, and, for each coding bit rate array in the coding bit rate array list, calculates an average QoE of the whole of content distribution target users and a coding parameter table based on average throughput distribution, and calculates a coding parameter table by which an average QoE of the whole of content distribution target users becomes the largest.

2. A quality-of-experience optimization apparatus configured to optimize quality (QoE: Quality of Experience) that a user experiences in a content distribution service, comprising:
circuitry configured to
input a distribution parameter candidate for content distribution, and output a recommend value for optimizing QoE;
estimate QoE based on the distribution parameter candidate, and calculate a distribution parameter for optimizing the QoE as the recommend value, the distribution parameter being calculated through a throughput estimation function that estimates a throughput from input data including a time at which the user accesses the content distribution service and information of a network that the user uses, a playback stop state estimation function, a QoE estimation function that estimates the QoE for all pairs of resolutions and frame rates of the content distribution based on a model equation that includes at least inputs of a respective resolution, frame rate, and coding bit rate for each QoE estimate, a resolution•frame rate recommend function that outputs one of the resolutions and one of the frame rates for which the QoE estimated by the QoE estimation function is largest, an initial coding parameter recommend function, and a real-time coding parameter recommend function; and
optimize the QoE in accordance with the recommend value,
wherein the initial coding parameter recommend function generates a coding bit rate array list, and, for each coding bit rate array in the coding bit rate array list, calculates an average QoE of the whole of content distribution target users and a coding parameter table based on average throughput distribution, and calculates a coding parameter table by which an average QoE of the whole of content distribution target users becomes the largest.

3. The quality-of-experience optimization apparatus as claimed in claim 2, wherein the circuitry is configured to
calculate QoE from information on coding of the distribution parameter candidate;
calculate a resolution and a frame rate by which the QoE calculated by the circuitry becomes the largest; and
calculate a coding parameter by which an average QoE of the whole of content distribution target users becomes the largest.

4. The quality-of-experience optimization apparatus as claimed in claim 2, wherein the circuitry is configured to
estimate the QoE based on a distribution parameter candidate and a setting value according to input data from a system administrator to calculate a distribution parameter that optimizes the QoE as the recommend value, and
update the setting value based on a distribution parameter candidate that is newly input or new input data from the system administrator.

5. A recommend request apparatus for optimizing QoE in a content distribution service, comprising:
circuitry configured to
output a distribution parameter candidate for content distribution, to a quality-of-experience optimization apparatus, in order to request a distribution parameter for optimizing QoE as a recommend value, the distribution parameter being calculated through a throughput estimation function that estimates a throughput from input data including a time at which the user accesses the content distribution service and information of a network that the user uses, a playback stop state estimation function, a QoE estimation function that estimates the QoE for all pairs of resolutions and frame rates of the content distribution based on a model equation that includes at least inputs of a respective resolution, frame rate, and coding bit rate for each QoE estimate, a resolution•frame rate recommend function that outputs one of the resolutions and one of the frame rates for which the QoE estimated by the QoE estimation function is largest, an initial coding parameter recommend function, and a real-time coding parameter recommend function;

receive the recommend value; and optimize the QoE in accordance with the recommend value, wherein the initial coding parameter recommend function generates a coding bit rate array list, and, for each coding bit rate array in the coding bit rate array list, calculates an average QoE of the whole of content distribution target users and a coding parameter table based on average throughput distribution, and calculates a coding parameter table by which an average QoE of the whole of content distribution target users becomes the largest.

6. A quality-of-experience optimization method, executed by a quality-of-experience optimization apparatus, for optimizing QoE in a content distribution service, comprising:

inputting a distribution parameter candidate for content distribution;

estimating QoE based on the distribution parameter candidate, and calculating a distribution parameter for optimizing the QoE as the recommend value, the distribution parameter being calculated through a throughput estimation function that estimates a throughput from input data including a time at which the user accesses the content distribution service and information of a network that the user uses, a playback stop state estimation function, a QoE estimation function that estimates the QoE for all pairs of resolutions and frame rates of the content distribution based on a model equation that includes at least inputs of a respective resolution, frame rate, and coding bit rate for each QoE estimate, a resolution•frame rate recommend function that outputs one of the resolutions and one of the frame rates for which the QoE estimated by the QoE estimation function is largest, an initial coding parameter recommend function, and a real-time coding parameter recommend function;

outputting the calculated recommend value; and optimizing the QoE in accordance with the calculated recommend value, wherein the initial coding parameter recommend function generates a coding bit rate array list, and, for each coding bit rate array in the coding bit rate array list, calculates an average QoE of the whole of content distribution target users and a coding parameter table based on average throughput distribution, and calculates a coding parameter table by which an average QoE of the whole of content distribution target users becomes the largest.

7. A recommend request method executed by a recommend request apparatus for optimizing QoE in a content distribution service, comprising:

outputting a distribution parameter candidate for content distribution in order to request a distribution parameter for optimizing QoE as a recommend value, the distribution parameter being calculated through a throughput estimation function that estimates a throughput from input data including a time at which the user accesses the content distribution service and information of a network that the user uses, a playback stop state estimation function, a QoE estimation function that estimates the QoE for all pairs of resolutions and frame rates of the content distribution based on a model equation that includes at least inputs of a respective resolution, frame rate, and coding bit rate for each QoE estimate, a resolution•frame rate recommend function that outputs one of the resolutions and one of the frame rates for which the QoE estimated by the QoE estimation function is largest, an initial coding parameter recommend function, and a real-time coding parameter recommend function;

receiving the recommend value; and optimizing the QoE in accordance with the recommend value, wherein the initial coding parameter recommend function generates a coding bit rate array list, and, for each coding bit rate array in the coding bit rate array list, calculates an average QoE of the whole of content distribution target users and a coding parameter table based on average throughput distribution, and calculates a coding parameter table by which an average QoE of the whole of content distribution target users becomes the largest.

8. A non-transitory computer-readable recording medium storing a program that causes a computer to function as each unit in the quality-of-experience optimization apparatus as claimed in claim 2.

9. A non-transitory computer-readable recording medium storing a program that causes a computer to function as each unit in the recommend request apparatus as claimed in claim 5.

* * * * *